(12) United States Patent
Shimodaira

(10) Patent No.: US 9,756,314 B2
(45) Date of Patent: Sep. 5, 2017

(54) THREE-DIMENSIONAL IMAGE PROCESSING APPARATUS, THREE-DIMENSIONAL IMAGE PROCESSING METHOD, THREE-DIMENSIONAL IMAGE PROCESSING PROGRAM, COMPUTER-READABLE RECORDING MEDIUM, AND RECORDING DEVICE

(71) Applicant: Keyence Corporation, Osaka (JP)

(72) Inventor: Masato Shimodaira, Osaka (JP)

(73) Assignee: Keyence Corporation, Osaka (JP)

( * ) Notice: Subject to any disclaimer, the term of this patent is extended or adjusted under 35 U.S.C. 154(b) by 581 days.

(21) Appl. No.: 14/459,338

(22) Filed: Aug. 14, 2014

(65) Prior Publication Data

US 2015/0109423 A1  Apr. 23, 2015

(30) Foreign Application Priority Data

Oct. 17, 2013  (JP) .................................. 2013-216850

(51) Int. Cl.
*H04N 13/00* (2006.01)
*H04N 13/02* (2006.01)
(Continued)

(52) U.S. Cl.
CPC ......... *H04N 13/0253* (2013.01); *G06T 7/521* (2017.01); *G06T 7/593* (2017.01);
(Continued)

(58) Field of Classification Search
CPC ............... H04N 13/00; H04N 13/0253; H04N 2013/0081; G06T 2207/10021; G06T 7/521; G06T 7/593
See application file for complete search history.

(56) References Cited

U.S. PATENT DOCUMENTS 7,813,591 B2 * 10/2010 Paley .................. A61B 5/4547
345/418
9,314,150 B2 * 4/2016 Chen ..................... A61B 1/247
(Continued)

FOREIGN PATENT DOCUMENTS

JP       2012-021909        2/2012

*Primary Examiner* — Anner N Holder
(74) *Attorney, Agent, or Firm* — Kilyk & Bowersox, P.L.L.C.

(57) ABSTRACT

A three-dimensional image processing apparatus includes: a distance image generating part capable of generating a distance image based on a plurality of images captured in an image capturing part; a pattern generating part for generating a first projection pattern and a second projection pattern whose fringe direction is different from that of the first projection pattern as a plurality of projection patterns obtained by changing a fringe direction of a projection pattern; and an incorrect-height determining part for making comparison in height information of a corresponding portion of an inspection target between a first distance image, generated in the distance image generating part based on a first pattern projected image, and a second distance image, generated based on a second pattern projected image, to determine height information of a portion where a difference not smaller than a predetermined value has occurred as incorrect.

12 Claims, 26 Drawing Sheets

(51) Int. Cl.
*G06T 7/521* (2017.01)
*G06T 7/593* (2017.01)

(52) U.S. Cl.
CPC ... *H04N 13/00* (2013.01); *G06T 2207/10021* (2013.01); *H04N 2013/0081* (2013.01)

(56) References Cited

U.S. PATENT DOCUMENTS

| | | | | |
|---|---|---|---|---|
| 2003/0007677 | A1* | 1/2003 | Hiroi | G06T 7/001 382/149 |
| 2008/0055591 | A1* | 3/2008 | Walton | G01N 21/8901 356/237.1 |
| 2009/0190139 | A1* | 7/2009 | Fisher | G01B 11/2518 356/613 |
| 2010/0007896 | A1* | 1/2010 | Fishbaine | G01N 21/8806 356/603 |
| 2012/0154576 | A1* | 6/2012 | Weston | G01B 11/007 348/136 |

* cited by examiner

THREE-DIMENSIONAL IMAGE PROCESSING APPARATUS, THREE-DIMENSIONAL IMAGE PROCESSING METHOD, THREE-DIMENSIONAL IMAGE PROCESSING PROGRAM, COMPUTER-READABLE RECORDING MEDIUM, AND RECORDING DEVICE

CROSS-REFERENCE TO RELATED APPLICATIONS

The present application claims foreign priority based on Japanese Patent Application No. 2013-216850, filed Oct. 17, 2013, the contents of which is incorporated herein by reference.

BACKGROUND OF THE INVENTION

1. Field of the Invention

The present invention relates to a three-dimensional image processing apparatus, a three-dimensional image processing method, a three-dimensional image processing program, a computer-readable recording medium, and a recording device.

2. Description of Related Art

In a large number of production sites such as factories, there have been introduced image processing apparatuses that realize automatic and fast performance of inspections, which have relied on viewing of humans. The image processing apparatus captures an image of a workpiece that comes flowing through a production line such as a belt conveyor by use of a camera, and executes measurement processing such as edge detection and area calculation for a predetermined region by use of the obtained image data. Then, based on a processing result of the measurement processing, the apparatus performs inspections such as detection of a crack on the workpiece and positional detection of alignment marks, and outputs determination signals for determining the presence or absence of a crack on the workpiece and positional displacement. In such a manner, the image processing apparatus may be used as one of FA (Factory Automation) sensors.

An image which is taken as a measurement processing target by the image processing apparatus that is used as the FA sensor is principally a brightness image not including height information. For this reason, speaking of the foregoing detection of a crack on the workpiece, the apparatus is good at stably detecting a two-dimensional shape of a cracked portion, but having difficulties in stably detecting a three-dimensional shape of, for example, a depression of a flaw which is not apt to appear in a brightness image. For example, it is thought that a type or a direction of illumination that illuminates the workpiece during the inspection is devised and a shade caused by a depression of a flaw is detected to indirectly detect a three-dimensional shape, but a clear shade is not necessarily always detected in the brightness image. In order to prevent an erroneous determination which is to erroneously detect a defective product as a non-defective product at the time of an unclear shade being detected, for example, if a determination threshold is biased to the safe side, the apparatus might determine a large number of non-defective products as defective products, to cause deterioration in production yield.

Accordingly, there is considered a visual inspection which uses not only a shade image that takes, as a pixel value, a shade value in accordance with a light reception amount of the camera but also a distance image that takes, as a pixel value, a shade value in accordance with a distance from the camera to the workpiece to two-dimensionally express a height (e.g. see Unexamined Japanese Patent Publication No. 2012-21909).

An example of the three-dimensional image processing apparatus is shown in a schematic view of FIG. 23. This three-dimensional image processing apparatus 190 is configured of a head section 191 provided with an image capturing part such as a light reception element, and a controller section 192 which is connected to the head section 191 and is sent image data captured in the head section 191, to generate a distance image from the acquired image data.

Here, the principle of triangulation will be described based on FIG. 23. In the head section 191, an angle α between an optical axis of incident light emitted from a light projecting section 110 and an optical axis of reflected light that is incident on a light receiving section 120 (optical axis of the light receiving section 120) is previously set. Here, when the workpiece WK is not mounted on a stage 140, incident light emitted from the light projecting section 110 is reflected by a point O on the workpiece WK mounting surface and is incident on the light receiving section 120. On the other hand, when the workpiece WK is mounted on the stage 140, the incident light emitted from the light projecting section 110 is reflected by a point A on the surface of the workpiece WK and is incident as reflected light on the light receiving section 120. Then, a distance d in an X-direction between the point O and the point A is measured, and based on this distance d, a height h of the point A on the surface of the workpiece WK is calculated.

Heights of all points on the surface of the workpiece WK are calculated applying the foregoing the measurement principle of triangulation, thereby to measure a three-dimensional shape of the workpiece WK. In a pattern projecting method, in order that all the points on the surface of the workpiece WK are irradiated with incident light, the incident light is emitted from the light projecting section 110 in accordance with a predetermined structured pattern, reflected light as the light reflected on the surface of the workpiece WK is received, and based on a plurality of received pattern images, the three-dimensional shape of the workpiece WK is efficiently measured.

As such a pattern projecting method, there are known a phase shift method, a spatial coding method, a multi-slit method and the like. By the three-dimensional measurement processing performed using the pattern projecting method, a projection pattern is changed to repeat image-capturing a plurality of times in the head section, and the images are transmitted to the controller section. In the controller section, computing is performed based on the pattern projected images transmitted from the head section, and a distance image having height information of the workpiece can be obtained.

In 3D measurement using the phase shift method and the spatial coding method by the configuration of the camera and the projector as thus described, a fringe pattern as shown in FIG. 24 is projected as a projection pattern PN. However, in the pattern projecting method, there has been a problem in that a measurement result which is incorrect in principle is obtained in a place where multi-reflection occurs. As shown in FIG. 25, especially on the side surface of the workpiece WK which stands upright as seen from the camera, measurement becomes incorrect due to an influence of mirror reflection, and post-stage processing is affected by mixture of an effective result and an incorrect result.

However, since an image of a mirror-reflected pattern is captured as a clear pattern, differently from the case of deficiency in light amount, it is displayed as a clear measurement result similar to a normal measurement result. It has hitherto been difficult to determine whether the result is abnormal and disadvantageously a different result from the original has been obtained.

Specifically, as in FIG. 26, there will be considered an example where an image of workpieces WKA, WKB and WKC placed on a stage ST for placing the workpiece WK is captured by means of a camera as an image capturing part 10 and a projector as a light projecting part 20. In this case, the workpieces WKA, WKB and WKC as seen from the camera are as in FIG. 27. In this state, when a projection pattern PN0 as in FIG. 24 is projected to the workpieces WKA, WKB and WKC, an image of a fringe pattern captured in the camera is as in FIG. 28. Among them, the fringe patterns obtained by capturing the workpiece WKB and the workpiece WKC are as in an enlarged view of FIG. 29. Here, since the side surfaces of the workpiece WKB and the workpiece WKC have acute angles as shown in FIG. 25, each of them comes into a state where a pattern on the bottom surface is reflected thereon, namely the mirror reflection occurs (in FIG. 29, foreign substances are displayed for facilitating understanding of reflection of mirror patterns due to the mirror reflection). As a result, there is obtained a pattern different from a pattern that should originally be obtained in a state where the mirror reflection does not occur. Specifically, an original distance image to be measured with respect to the workpieces of FIG. 27 should be as in FIG. 30A, but as a result of capturing of the image of the fringe pattern as in FIG. 28, an incorrect distance image as in FIG. 30B is measured. It is to be noted that in these drawings, a region which is shaded by the workpiece and whose height is thus non-measurable is shown by being painted out in black. Further, a brighter place (a place closer to white) indicates it has a larger height, and a darker place indicates it has a smaller height.

As apparent by comparing FIG. 30A and FIG. 30B, a normal height has been measured concerning the workpiece WKA. On the other hand, as for the workpiece WKB, the top surface has been correctly measured since no mirror reflection occurs, but the front-side surface has been computed as incorrect height information as if it is continuous with the floor surface of the stage ST at the same height. Further, as for the workpiece WKC, the top surface has been correctly measured as well, but an incorrect measurement result has been obtained for the side surface facing lower left as if it further goes under the floor surface of the stage.

The reason why such incorrect results are computed is that, as a result of occurrence of the mirror reflection, a projection pattern different from a projection pattern that should originally be obtained is measured and a result of height calculation by means of triangulation thus becomes incorrect. Specifically, in the case of the workpiece WKB, as shown in FIG. 31C, the fringe pattern is projected from an oblique direction by the projector to the side surface of the workpiece WKB, and hence height information is acquired at an intersection with a visual line of an observation point. When such a fringe pattern is projected to the workpiece WKB, an original normal projection pattern is as in FIG. 31A. However, as a result of occurrence of the mirror reflection, a pattern on the floor surface of the stage is reflected on the side surface, and a projection pattern as in FIG. 31B is obtained. For example, when a focus is placed on an observation point $P_1$ on the side surface of FIG. 31A, it should originally be irradiated with a fringe 3, but it actually looks as if being irradiated with a fringe 2 as in FIG. 31B. Consequently, as in FIG. 31C, height information of the side surface of the workpiece WKB is detected not as one at an intersection of the visual line of the observation point with the fringe 3 which has an original height, but as one at an intersection with the fringe 2, resulting in that the side surface is measured as having the same height as that of the floor surface of the stage.

Further, in the case of the workpiece WKC, as shown in FIG. 32C, when the fringe pattern is projected from an oblique direction from the projector to the side surface of the workpiece WKC, an original normal projection pattern should be as in FIG. 32A, but a projection pattern as in FIG. 32B is obtained due to the mirror reflection. In this example, when a focus is placed on an observation point $P_2$, it should originally be irradiated with a fringe 5, but it actually looks as if being irradiated with a fringe 4 as in FIG. 32B. Consequently, as in FIG. 32C, height information of the side surface of the workpiece WKC is detected not as one at an intersection of a visual line of the observation point with the fringe 5 which has an original height, but as one at an intersection with the fringe 4, resulting in that the side surface is measured as having a smaller height than that of the floor surface of the stage.

As thus described, in a portion where the mirror reflection has occurred, it is not possible to distinguish between a normal measurement result and an incorrect measurement result, thus causing a problem of affecting the post-stage processing.

SUMMARY OF THE INVENTION

The present invention is for solving the conventional problems as described above. A principal object of the present invention is to provide a three-dimensional image processing apparatus, a three-dimensional image processing method, a three-dimensional image processing program, a computer-readable recording medium, and a recording device, each being capable of suppressing a measurement error due to multi-reflection.

For achieving the above object, a three-dimensional image processing apparatus according to one embodiment of the present invention is a three-dimensional image processing apparatus, which is capable of acquiring a distance image that includes height information of an inspection target and also performing image processing based on the distance image. The apparatus can include: a light projecting part for projecting incident light as structured illumination of a predetermined fringe-like projection pattern from an oblique direction with respect to an optical axis of a below-described image capturing part; the image capturing part for acquiring reflected light that is projected by the light projecting part and reflected on an inspection target, to capture a plurality of pattern projected images; a distance image generating part capable of generating a distance image based on the plurality of images captured in the image capturing part; a pattern generating part for generating a first projection pattern and a second projection pattern whose fringe direction is different from that of the first projection pattern as a plurality of projection patterns obtained by changing a fringe direction of the projection pattern; and an incorrect-height determining part for making comparison in height information of a corresponding portion of the inspection target between a first distance image, generated by the distance image generating part based on a first pattern projected image obtained by projecting from the light-projecting part the first projection pattern generated in the pattern generating part and capturing an image of the first projection pattern in the image capturing part, and a second distance image, generated based on a second pattern projected image obtained by the second projection pattern projected from the common light projecting part, to determine height information of a portion where a difference not smaller than a predetermined value has occurred as incorrect. With the above configuration, a portion where incorrect height information has occurred due to mirror reflection or the like can be detected, which has hitherto been difficult, thereby to allow improvement in reliability of a measurement result.

Further, in a three-dimensional image processing apparatus according to another embodiment, it can be configured such that the pattern generating part generates as the first projection pattern a projection pattern whose fringe direction is inclined with respect to a vertical direction and a horizontal direction.

Further, in a three-dimensional image processing apparatus according to another embodiment, it can be configured such that the pattern generating part generates as the first projection pattern a projection pattern whose fringe direction is inclined by 45° from the vertical direction.

Further, in a three-dimensional image processing apparatus according to another embodiment, it can be configured such that the pattern generating part generates as the second projection pattern a projection pattern that is symmetrical to the first projection pattern.

Further, in a three-dimensional image processing apparatus according to another embodiment, the pattern generating part can include a digital micro-mirror device.

Further, in a three-dimensional image processing apparatus according to another embodiment, a micro-mirror constituting each pixel of the digital micro-mirror device has a rectangular shape in a plan view, and each micro-mirror can be arranged in a posture inclined in a diamond shape. With the above configuration, there can be obtained an advantage of reducing the roughness of the fringes at the time of projecting the projection pattern inclined diagonally.

Further, in a three-dimensional image processing apparatus according to another embodiment, it can be configured such that the distance image generating part is capable of generating a synthetic image obtained by averaging the first distance image and the second distance image except for a portion determined as incorrect in the incorrect-height determining part. With the above configuration, there can be obtained an advantage of being able to generate a distance image where a portion including incorrect height information is removed while the measurement accuracy in the other region is further improved.

Further, in a three-dimensional image processing apparatus according to another embodiment, it can be configured such that the incorrect-height determining part inserts a flag as incorrect information into a portion where a difference not smaller than the predetermined value is determined to have occurred. With the above configuration, at the time of performing computing by use of height information, a portion with an incorrect value can be readily specified, to allow processing not affected by the incorrect result.

Further, in a three-dimensional image processing apparatus according to another embodiment, the incorrect-height determining part can treat a portion where a difference not smaller than the predetermined value is determined to have occurred, in a similar manner to a non-measurable place. With the above configuration, at the time of performing computing by use of height information, a portion with an incorrect value can be treated in a similar manner to a place where phase-shift contrast is low due to a shade and measurement cannot be performed, or some other place.

Further, in a three-dimensional image processing apparatus according to another embodiment, the light projecting part can project structured illumination for obtaining the distance image by use of at least a phase shift method and a spatial coding method.

Further, a three-dimensional image processing method according to another embodiment is a three-dimensional image processing method for acquiring a distance image that includes height information of an inspection target and performing image processing based on the distance image. The method can include the steps of: previously setting a first projection pattern and a second projection pattern whose fringe direction is different from that of the first projection pattern as a plurality of projection patterns obtained by changing a fringe direction of a projection pattern for structured illumination, and projecting from a light projecting part incident light as structured illumination of the first projection pattern from an oblique direction with respect to an optical axis of an image capturing part; acquiring reflected light that is projected by the light projecting part and reflected on an inspection target, to capture a first pattern projected image in the image capturing part; generating a first distance image in a distance image generating part based on a plurality of images captured in the image capturing part; projecting from the light projecting part incident light as structured illumination of the second projection pattern from the same direction as the first projection pattern with respect to the optical axis of the image capturing part; acquiring reflected light that is projected by the light projecting part and reflected on the inspection target, to capture a second pattern projected image in the image capturing part; generating a second distance image in the distance image generating part based on a plurality of images captured in the image capturing part; and making comparison in height information of a corresponding portion of the inspection target between the first distance image and the second distance image, to determine height information of a portion where a difference not smaller than a predetermined value has occurred as incorrect if this exists. Herewith, a portion where incorrect height information has occurred due to mirror reflection or the like can be detected, which has hitherto been difficult, thereby to allow improvement in reliability of a measurement result.

Further, a three-dimensional image processing program according to another embodiment is a three-dimensional image processing program, which is capable of acquiring a distance image that includes height information of an inspection target and also performing image processing based on the distance image. The program can allow a computer to realize: a projection pattern setting function of previously setting a first projection pattern and a second projection pattern whose fringe direction is different from that of the first projection pattern as a plurality of projection patterns obtained by changing a fringe direction of a projection pattern for structured illumination; a distance image generating function of generating a first distance image and a second distance image based on a first pattern projected image and a second pattern projected image captured by projecting by a light projecting part incident light as structured illumination of the first projection pattern and the second projection pattern set by the projection pattern setting function, from an oblique direction with respect to an optical axis of an image capturing part and acquiring reflected light reflected on an inspection target; and an incorrect-height determining function of making comparison in height information of a corresponding portion of the inspection target between the first distance image and the second distance image, to determine height information of a portion where a difference not smaller than a predetermined value has occurred as incorrect if this exists. With the above configuration, a portion where incorrect height information has occurred due to mirror reflection or the like can be detected, which has hitherto been difficult, thereby to allow improvement in reliability of a measurement result.

Further, a computer-readable recording medium or a storage device according to another embodiment is one in which the three-dimensional image processing program is to be stored. The recording medium includes a magnetic disk, an optical disk, a magneto-optical disk, a semiconductor memory, and other program-storable medium, such as a CD-ROM, a CD-R, a CD-RW, a flexible disk, a magnetic tape, an MO, a DVD-ROM, a DVD-RAM, a DVD-R, a DVD+R, a DVD-RW, a DVD+RW, a Blu-ray (registered trademark), and an HD-DVD (AOD). Further, the program includes one in the form of being distributed by downloading through a network such as the Internet, in addition to one stored into the above recording medium and distributed. Moreover, the storage device includes general-purpose or a special-purpose device mounted with the program in the form of software, firmware or the like, in an executable state. Furthermore, each processing and each function included in the program may be executed by program software that is executable by the computer, and processing of each section may be realized by predetermined hardware such as a gate array (FPGA, ASIC) or in the form of program software being mixed with a partial hardware module that realizes some element of hardware.

DETAILED DESCRIPTION OF PREFERRED EMBODIMENTS

Hereinafter, embodiments of the present invention will be described based on the drawings. However, the embodiments shown hereinafter are ones illustrating a three-dimensional image processing apparatus, a state-change determining method for a three-dimensional image processing apparatus, a state-change determining program for a three-dimensional image processing apparatus, a computer-readable recording medium and a recording device for the purpose of embodying technical ideas of the present invention, and the present invention does not specify, to the following, the three-dimensional image processing apparatus, the state-change determining method for the three-dimensional image processing apparatus, the state-change determining program for the three-dimensional image processing apparatus, the computer-readable recording medium and the recording device. Further, the present specification is not to specify members shown in the claims to members of the embodiments. Especially, sizes, materials, shapes, relative disposition and the like of constituent components described in the embodiments are not intended to restrict the scope of the present invention thereto, but are mere explanatory examples. It is to be noted that sizes, positional relations and the like of members shown in each drawing may be exaggerated for clarifying a description. Further, in the following description, the same name and symbol denote the same member or members of the same quality, and a detailed description thereof will be omitted as appropriate. Moreover, each element constituting the present invention may have a mode where a plurality of elements are configured of the same member and the one member may serve as the plurality of elements, or conversely, a function of one member can be shared and realized by a plurality of members.

Further, when a "distance image (height image) is referred to in the present specification, it is used in the meaning of being an image including height information, and for example, it is used in the meaning of including in the distance image a three-dimensional synthesized image obtained by pasting an optical brightness image to the distance image as texture information. Moreover, a displayed form of the distance image in the present specification is not restricted to one displayed in a two-dimensional form, but includes one displayed in a three-dimensional form.

First Embodiment

Figure 1:
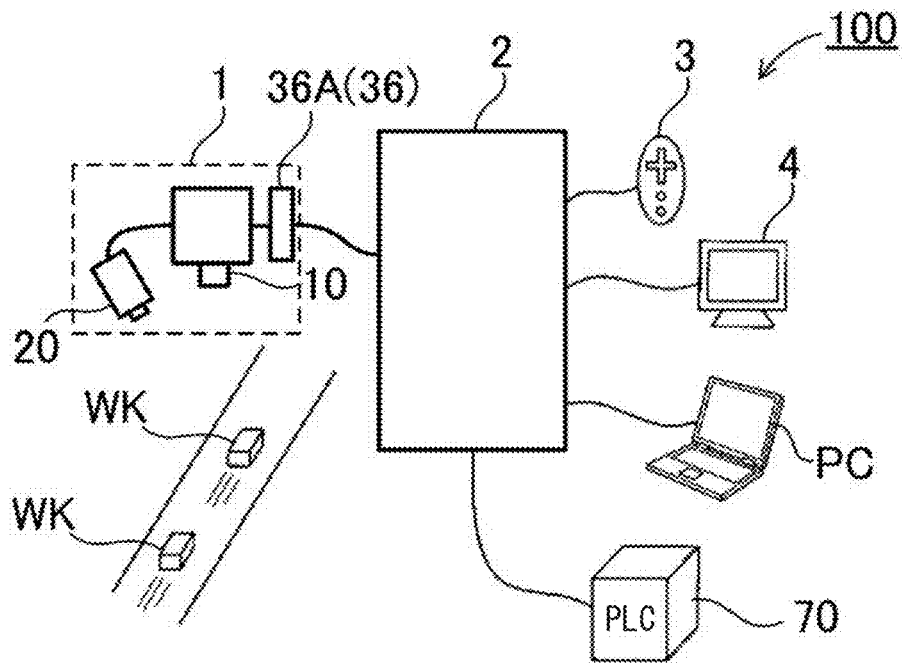
FIG. 1 is a view showing a system constitutional example of a three-dimensional image processing system including an image processing apparatus according to an embodiment of the present invention.

FIG. 1 shows a configuration of a three-dimensional image processing apparatus according to a first embodiment of the present invention. This three-dimensional image processing apparatus 100 is provided with a head section 1 and a controller section 2. The head section 1 is provided with a light projecting part 20 for illuminating an inspection target (workpiece) WK, an image capturing part 10 for capturing an image of the workpiece WK, and a head-side communication part 36 for connecting with the controller section 2.

On the other hand, the controller section 2 executes measurement processing such as edge detection and area calculation based on the captured image. Moreover, the controller section 2 can be detachably connected with a display part 4 such as a liquid crystal panel, an input part 3 such as a console for a user performing a variety of operations on the display part 4, a PLC (Programmable Logic Controller), and the like.

The above three-dimensional image processing apparatus 100 projects measurement light to the workpiece WK by the light projecting part 20 of the head section 1, and reflected light which has been incident and reflected on the workpiece WK is captured as a pattern projected image in the image capturing part 10. Further, a distance image is generated based on the pattern projected image, and this distance image is further converted to a low-tone distance image obtained by replacing height information in each pixel with brightness. The controller section 2 executes measurement processing such as edge detection and area calculation based on the converted low-tone distance image.

It is to be noted that the workpiece WK as an inspection target is, for example, an article which is sequentially carried on a production line, and is moving or standing still. Further, the moving workpiece includes one that rotates, in addition to one that moves by means of, for example, a conveyor.

(Light Projecting Part 20)

The light projecting part 20 is used as illumination that illuminates the workpiece WK for generating the distance image. Therefore, the light projecting part 20 can, for example, be a pattern projector or the like for projecting a sinusoidal fringe pattern to the workpiece in accordance with a pattern projecting method for acquiring the distance image. Further, in addition to the light projecting part, a general illumination apparatus for performing bright field illumination or dark field illumination may be separately provided. Alternatively, it is also possible to allow the light projecting part 20 to have a function as the general illumination apparatus.

The controller section 2 executes image processing by use of distance image data acquired from the head section 1, and outputs a determination signal as a signal indicating a determination result for the defectiveness/non-defectiveness of the workpiece, or the like, to a control device such as an externally connected PLC 70.

The image capturing part 10 captures an image of the workpiece based on a control signal that is inputted from the PLC 70, such as an image capturing trigger signal that specifies timing for fetching image data from the image capturing part 10.

The display part 4 is a display apparatus for displaying image data obtained by capturing the image of the workpiece and a result of measurement processing by use of the image data. Generally, the user can confirm an operating state of the controller section 2 by viewing the display part 4. The input part 3 is an input apparatus for moving a focused position or selecting a menu item on the display part 4. It should be noted that in the case of using a touch panel for the display part 4, it can serve as both the display part and the input part.

Further, the controller section 2 can also be connected to a personal computer PC for generating a control program of the controller section 2. Moreover, the personal computer PC can be installed with a three-dimensional image processing program for performing a setting concerning three-dimensional image processing, to perform a variety of settings for processing that is performed in the controller section 2. Alternatively, by means of software that operates on this personal computer PC, it is possible to generate a processing sequence program for prescribing a processing sequence for image processing. In the controller section 2, each image processing is sequentially executed along the processing sequence. The personal computer PC and the controller section 2 are connected with each other via a communication network, and the processing sequence program generated on the personal computer PC is transferred to the controller section 2 along with, for example, layout information for prescribing a display mode of the display part 4, or the like. Further, in contrast, the processing sequence program, layout information and the like can be fetched from the controller section 2 and edited on the personal computer PC.

It is to be noted that this processing sequence program may be made generable not only on the personal computer PC but also in the controller section 2.

Modified Example

It is to be noted that, although the dedicated hardware is constructed as the controller section 2 in the above example, the present invention is not restricted to this configuration. For example, as in a three-dimensional image processing apparatus 100' according to a modified example shown in FIG. 2, one formed by installing a dedicated inspection program or the three-dimensional image processing program into a general-purpose personal computer, a work station or the like can be functioned as a controller section 2' and used as connected to the head section 1. This three-dimensional image processing apparatus performs a necessary setting for the image processing and the like by means of the three-dimensional image processing program, and thereafter performs the image processing on the low-tone distance image in accordance with the pattern projected image captured in the head section 1, to perform a necessary inspection.

(Head-Side Communication Part 36)

Figure 2:
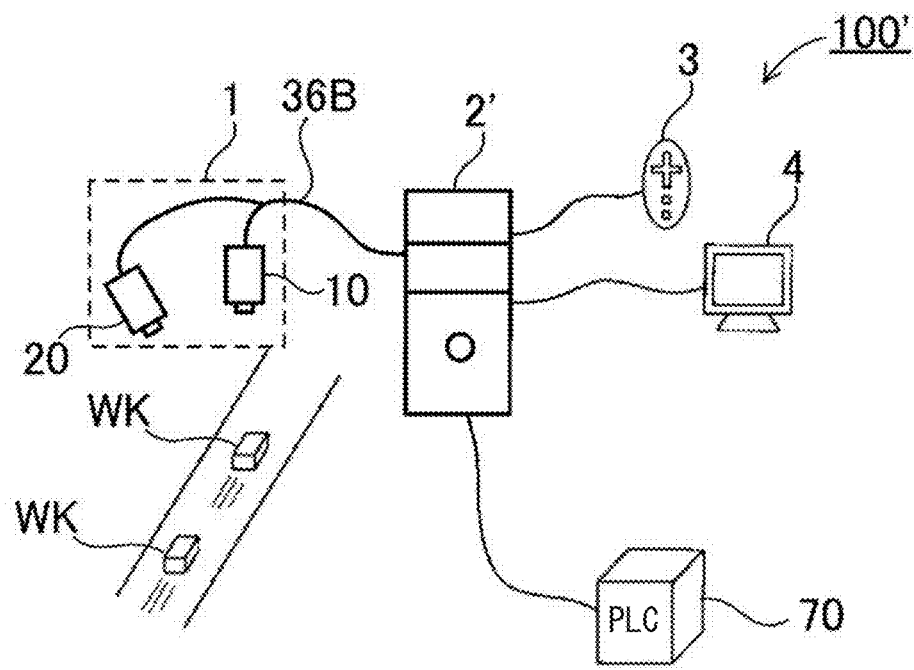
FIG. 2 is a view showing a system constitutional example of a three-dimensional image processing system according to a modified example of the present invention.

Further, in accordance therewith, such an interface as to be connected to either the dedicated controller section 2 or the personal computer that functions as the controller section 2 can also be provided as the head-side communication part 36 on the head section 1 side. For example, the head section 1 is provided with, as the head-side communication part 36, a controller connecting interface 36A for connecting with the controller section 2 as shown in FIG. 1, or a PC connecting interface 36B for connecting with the personal computer as shown in FIG. 2. Further, if such an interface is formed in a unit type so as to be replaceable, other configurations of the head section are made common to a certain extent, and the common head section can thereby be connected with either the controller section or the personal computer. Alternatively, there can be provided one head-side communication part provided with an interface connectable with either the dedicated controller section 2 or the personal computer. Further, as such an interface, an existing communication standard such as Ethernet (product name), a USB or RS-232C may be used. Moreover, a prescribed or general-use communication system is not necessarily applied, but a dedicated communication system may be applied.

(PC Connection Mode)

Further, the three-dimensional image processing program can be provided with a PC connection mode for performing a setting in the case of using the personal computer as the controller section 2' connected to the head section 1. That is, by changing settable items and setting contents depending on whether the controller section is dedicated hardware or the personal computer, it is possible in either case to appropriately perform a setting regarding three-dimensional image processing. Further, a viewer program provided with a purpose of confirming an operation of the head section 1 and with a simple measurement function may be installed into the personal computer that functions as the controller section 2' so that an operation and a function of the connected head section can be confirmed.

It is to be noted that the "distance image" obtained by using the image capturing part 10 and the light projecting part 20 shown in FIG. 1 refers to an image in which a shade value of each pixel changes in accordance with a distance from the image capturing part 10, which captures the image of the workpiece WK, to the workpiece WK. In other words, the "distance image" can be said to be an image in which a shade value is decided based on the distance from the image capturing part 10 to the workpiece WK. It can also be said to be a multi-level image having a shade value in accordance with the distance to the workpiece WK. It can also be said to be a multi-level image having a shade value in accordance with a height of the workpiece WK. Further, it also be said to be a multi-level image obtained by converting the distance from the image capturing part 10 to a shade value with respect to each pixel of a brightness image.

As a technique for generating the distance image, there are roughly divided two systems: one is a passive system (passive measurement system) for generating the distance image by use of an image captured on an illumination condition for obtaining a normal image; and the other one is an active system (active measurement system) for generating the distance image by actively performing irradiation with light for measurement in a height direction. A representative technique of the passive system is a stereo measurement method. In this technique, the distance image can be generated only by preparing two or more image capturing parts 10 and disposing these two or more cameras in a predetermined positional relation, and hence it is possible to generate the distance image through use of a general image processing system for generating a brightness image, so as to suppress system construction cost.

On the other hand, representative techniques of the active system are the light cutting method and the pattern projecting method. The light cutting method is that in the foregoing stereo measurement method, the one camera is replaced with a light projecting part such as a light projector, linear laser light is projected to the workpiece, and the three-dimensional shape of the workpiece is reproduced from a distorted condition of an image of the linear light in accordance with a shape of the object surface. In the light cutting method, deciding the corresponding point is unnecessary, thereby to allow stable measurement. However, since the measurement with respect to only one line is possible per one measurement, when measured values of all the pixels are intended to be obtained, the target or the camera needs scanning. As opposed to this, the pattern projecting method is that a shape, a phase or the like of a predetermined pattern projected to the workpiece is shifted to capture a plurality of images and the captured plurality of images are analyzed, to reproduce the three-dimensional shape of the workpiece. There are several sorts of pattern projecting methods, and representative ones among them include: a phase shift method in which a phase of a sinusoidal wave fringe pattern is shifted to capture a plurality of (at least three or more) images and a phase of a sinusoidal wave with respect to each pixel from the plurality of images is found, to find three-dimensional coordinates on the surface of the workpiece through use of the found phase; a moire topography method in which the three-dimensional shape is reproduced through use of a sort of waving phenomenon of a spatial frequency when two regular patterns are synthesized; a spatial coding method in which a pattern to be projected to the workpiece is itself made different in each image-capturing, for example, each of fringe patterns, whose fringe width with a monochrome duty ratio of 50% gets thinner to one-half, to one-quarter, to one-eighth, . . . of a screen, is sequentially projected, and a pattern projected image with each pattern is shot, to find an absolute phase of the height of the workpiece; and a multi-slit method in which a patterned illumination of a plurality of thin lines (multi-slit) is projected to the workpiece and the pattern is moved at a pitch narrower than a slit cycle, to perform a plurality of times of shooting.

In the three-dimensional image processing apparatus 100 according to the present embodiment, the distance image is generated by the phase shift method and the spatial coding method described above. This allows generation of the distance image without relatively moving the workpiece or the head.

A disposition layout of the image capturing part 10 and the light projecting part 20 in FIG. 1 is made so as to hold the light projecting part 20 obliquely and the image capturing part 10 vertically such that light is projected to the workpiece WK from an oblique direction and reflected light from the workpiece WK is received in almost a vertical direction. By making the light projecting direction and the image capturing direction disagree and inclined with each other, it is possible to capture a pattern projected image that has captured a shade caused by the unevenness of the surface shape of the workpiece WK.

Second Embodiment

Figure 3:
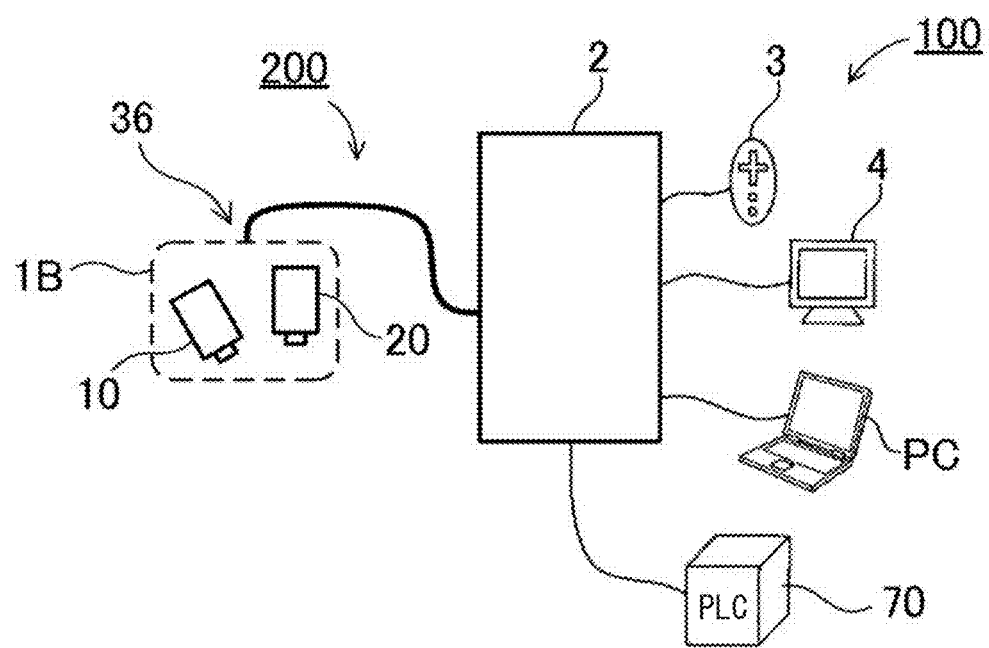
FIG. 3 is a schematic view showing a hardware configuration of a three-dimensional image processing apparatus according to a second embodiment of the present invention.

However, the present invention is not restricted to this disposition example, and for example, as in a three-dimensional image processing apparatus 200 according to a second embodiment shown in FIG. 3, a disposition example may be adopted where the image capturing part 10 side is held obliquely with respect to the workpiece WK and the light projecting part 20 side is held vertically. Also by a head section 1B as thus disposed, similarly, it is possible to incline the light projecting direction and the image capturing direction with each other, so as to capture a pattern projected image that has captured the shade of the workpiece WK.

Third Embodiment

Further, one of or both the light projecting part and the image capturing part can be disposed in a plurality of number. For example, as in a three-dimensional image processing apparatus 300 shown in FIG. 4A as a third embodiment, while the image capturing part 10 is held vertically with respect to the workpiece WK, two light projecting parts 20 are disposed on both sides with the image capturing part 10 placed at the center, which can thus be configured as a head section 1C that projects light from right and left. As thus described, by capturing pattern projected images while projecting light in different directions, it is possible to reduce a situation where the height measurement is inaccurate or impossible due to occurrence of the state of being unable to capture some part of the pattern projected image, such as the state of the workpiece WK itself hiding a shade pattern by light projection from one direction. Especially when the light projecting part 20 is disposed so as to receive light projection from directions opposed to each other with respect to the workpiece (e.g., right and left directions or front and rear directions), it is possible to significantly reduce the possibility that the image cannot be captured due to being blocked by the workpiece itself.

Fourth Embodiment

The configuration has been described in the above example where the one image capturing part and the two light projecting parts are used, but in contrast, there can also be formed a configuration where two image capturing parts and one light projecting part are used. FIG. 4B shows such an example as a three-dimensional image processing apparatus 400 according to a fourth embodiment. In a head section 1D shown in this example, the light projecting part 20 is held vertically with respect to the workpiece WK, and the image capturing parts 10 are disposed on the right and left to the light projecting part 20 in the drawing obliquely with respect to the workpiece WK. Also in this configuration, it is possible to capture images of the workpiece WK in different angles of inclination, so as to suppress a situation where some part of the pattern projected image becomes difficult to capture, as in the third embodiment. Moreover, it is possible by this method to simultaneously capture two pattern projected images by one light projection, so as to also obtain an advantage of being able to reduce the processing time.

On the other hand, there are differences in image-captured region, field of view, and the like between images of the same workpiece captured by the two image capturing parts from different angles, and hence it is necessary to perform an operation for making correspondence between positions of pixels of one image and those of another, which can lead to occurrence of an error. As opposed to this, according to the foregoing third embodiment, with the image capturing part made common, images with the same field of view can be captured when measurement light is projected from either light projecting part, thereby eliminating the need for such an integration operation as above, and it is possible to obtain an advantage of being able to avoid occurrence of an error associated with the integration operation, so as to simplify the processing.

It is to be noted that, although the embodiments have been described above where the image capturing part 10 and the light projecting part 20 are integrally configured in each head section, the present invention is not restricted to this configuration. For example, the head section can be one where the image capturing part 10 and the light projecting part 20 are made up of separate members. Further, it is also possible to provide the image capturing parts and the light projecting parts in number of three or more.

(Block Diagram)

Figure 5:
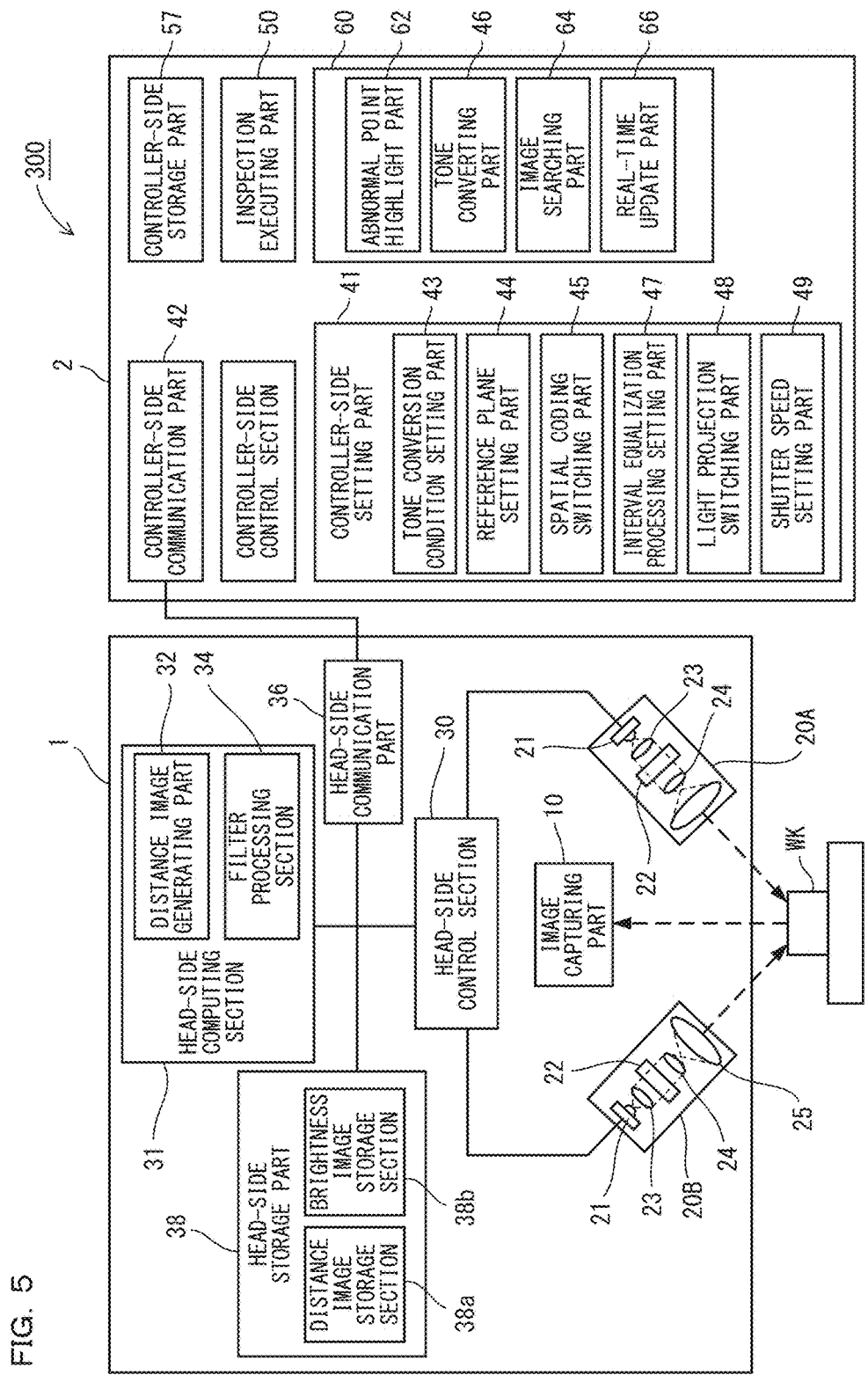
FIG. 5 is a block diagram showing a three-dimensional image processing apparatus according to the third embodiment of the present invention.

Next, FIG. 5 shows a block diagram showing the configuration of the three-dimensional image processing apparatus 300 according to the third embodiment of the present invention. As shown in FIG. 5, the three-dimensional image processing apparatus 300 is provided with the head section 1 and the controller section 2.

(Head Section 1)

This head section 1 is provided with the light projecting part 20, the image capturing part 10, a head-side control section 30, a head-side computing section 31, a head-side storage part 38, the head-side communication part 36, and the like. The light projecting part 20 includes a measurement light source 21, a pattern generating part 22 and a plurality of lenses 23, 24, 25. The image capturing part 10 includes a camera and a plurality of lenses, though not shown.

(Light Projecting Part 20)

The light projecting part 20 is a member for projecting incident light as structured illumination of a predetermined projection pattern from the oblique direction with respect to an optical axis of the image capturing part. A projector can be used as this light projecting part 20, and it includes a lens as an optical member, the pattern generating part 22, and the like. The light projecting part 20 is disposed obliquely above the position of the workpiece that stops or moves. It is to be noted that the head section 1 can include a plurality of light projecting parts 20. In the example of FIG. 5, the head section 1 includes two light projecting parts 20. Here, there are disposed a first projector 20A capable of irradiating the workpiece with measuring illumination light from a first direction (right side in FIG. 5) and a second projector 20B capable of irradiating the workpiece with measuring illumination light from a second direction which is different from the first direction (left side in FIG. 5). The first projector 20A and the second projector 20B are disposed symmetrically, with the optical axis of the image capturing part 10 placed therebetween. Measurement light is projected to the workpiece alternately from the first projector 20A and the second projector 20B, and pattern images of the respective reflected light are captured in the image capturing part 10.

As the measurement light source 21 of each of the first projector 20A and the second projector 20B, for example, a halogen lamp that emits white light, a white LED (light emitting diode) that emits white light, or the like can be used. Measurement light emitted from the measurement light source 21 is appropriately collected by the lens, and is then incident on the pattern generating part 22.

Further, on top of the light projecting part that emits the measurement light for acquiring the pattern projected image to generate the distance image, an observing illumination light source for capturing a normal optical image (brightness image) can also be provided. As the observing illumination light source, in addition to the LED, a semiconductor laser (LD), a halogen lamp, an HID (High Intensity Discharge), or the like can be used. Especially in the case of using an element capable of capturing a color image as the image capturing element, a white light source can be used as the observing illumination light source.

Figure 6:
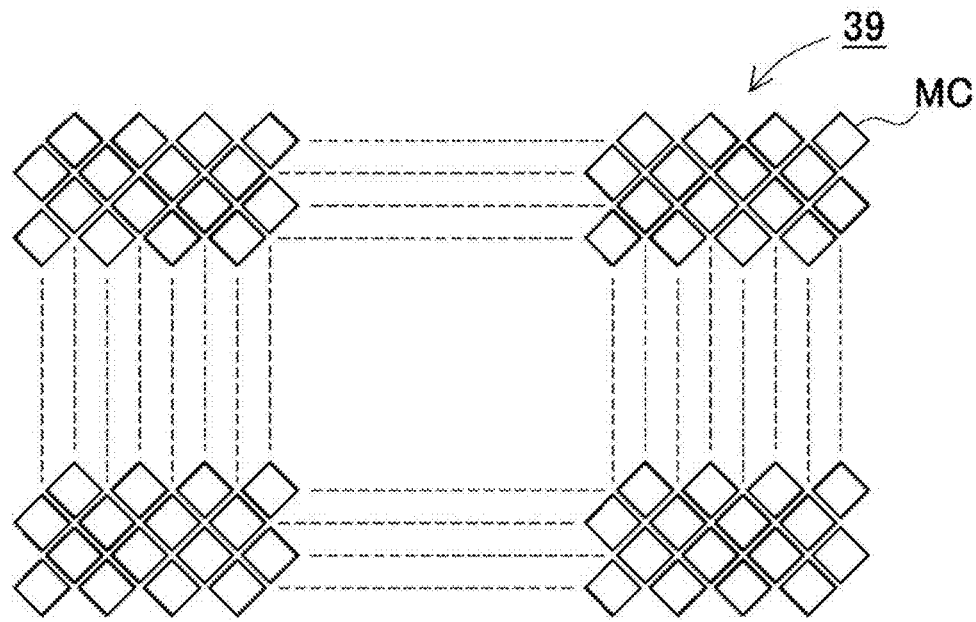
FIG. 6 is a plan view showing a DMD arranged with micro-mirrors each formed in a diamond shape.

Measurement light emitted from the measurement light source 21 is appropriately collected by the lens 23, and is then incident on the pattern generating part 22. The pattern generating part 22 can realize illumination of an arbitrary pattern. For example, it can invert the pattern in accordance with colors of the workpiece and the background, such as black on a white background or white on a black background, so as to express an appropriate pattern easy to see or easy to measure. As such a pattern generating part 22, for example, a DMD (Digital Micro-mirror Device) can be used. FIG. 6 shows an example of the DMD. A DMD 39 shown in this drawing can express an arbitrary pattern by switching on/off a minute mirror (micro-mirror MC) with respect to each pixel. This allows easy irradiation with the pattern with black and white inverted. Using the DMD as the pattern generating part 22 allows easy generation of the arbitrary pattern and eliminates the need for preparing a mechanical pattern mask and performing an operation for replacing the mask, thus leading to an advantage of being able to reduce the size of the apparatus and perform rapid measurement. Further, since the pattern generating part 22 configured with the DMD can be used in a similar manner to normal illumination by performing irradiation with a full-illumination pattern being turned on for all the pixels, it can also be used for capturing the brightness image.

Figure 7:
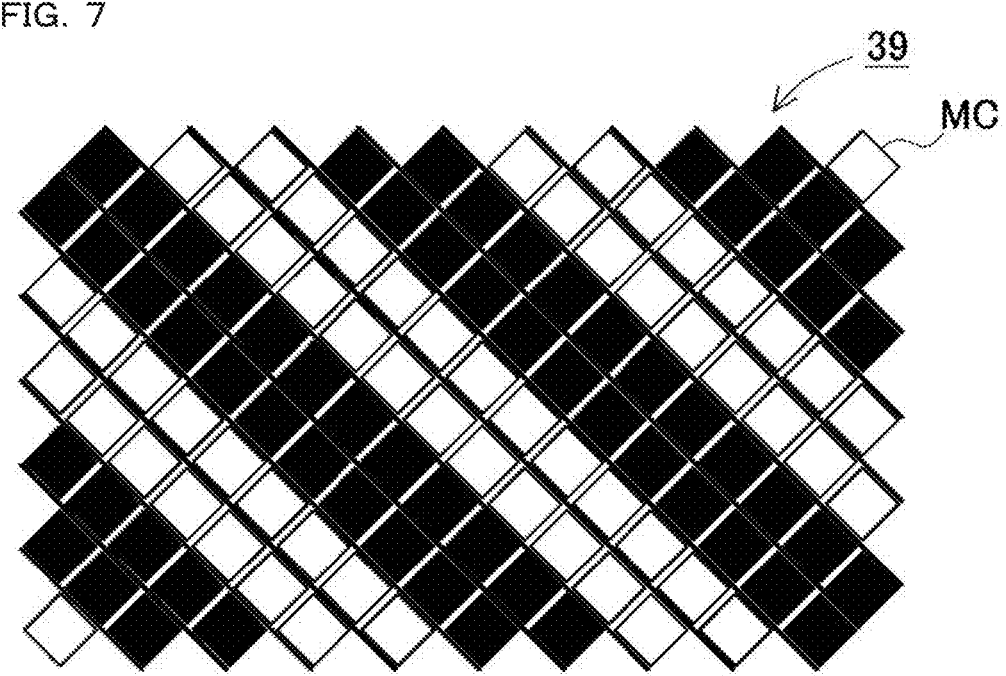
FIG. 7 is an enlarged plan view showing the micro-mirrors that constitute the DMD of FIG. 6.
Figure 8:
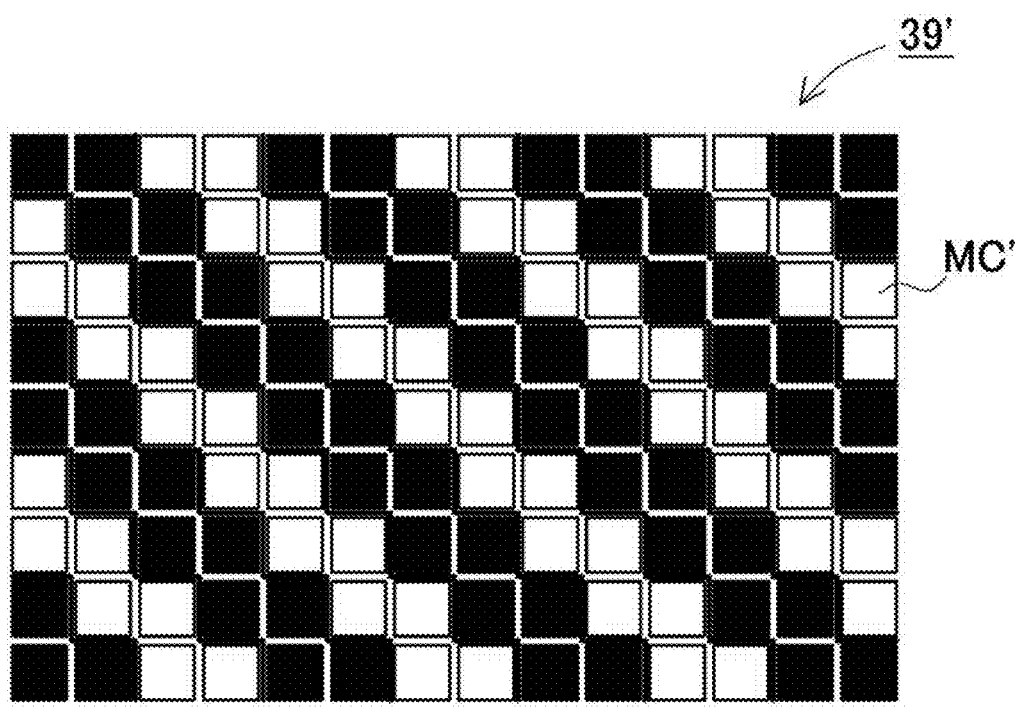
FIG. 8 is a plan view showing a DMD arranged with micro-mirrors in a grid pattern.

Each micro-mirror MC is formed in a rectangular shape. In the example of the DMD 39 of FIG. 6, the micro-mirrors MC are each arranged in a posture inclined in a diamond shape. As a result, it has an advantage of being able to neatly draw each line constituting a projection pattern at the time of forming the projection pattern in the shape of diagonal fringes as shown in FIG. 7. In contrast, in an example of a DMD 39' where micro-mirrors MC' are arranged in a grid pattern as shown in FIG. 8, each line becomes jagged at the time of drawing a diagonal projection pattern. For this reason, in the case of projecting a projection pattern inclined diagonally as described later, it is possible to reduce the roughness of the fringes by use of the inclined arrangement type DMD as in FIG. 7.

It is to be noted that the pattern generating part 22 is not restricted to the DMD, but can also be an LCD (Liquid Crystal Display), an LCOS (Liquid Crystal on Silicon: reflective liquid crystal element), or a mask. The measurement light having been incident on the pattern generating part 22 is converted to light with a previously set pattern and a previously set intensity (brightness), and then emitted. The measurement light emitted from the pattern generating part 22 is converted to light having a larger diameter than an observable and measurable field of view of the image capturing part 10 by means of the plurality of lenses, and thereafter the workpiece is irradiated with the converted light.

(Image Capturing Part 10)

The image capturing part 10 is provided with a camera for acquiring reflected light that is projected by the light projecting part 20 and reflected on the workpiece WK, to capture a plurality of pattern projected images. As such a camera, a CCD, a CMOS or the like can be used. In this example, there is used a monochrome CCD camera that can obtain a high resolution. In addition, it goes without saying that a camera capable of capturing a color image can also be used. Further, the image capturing part can also capture a normal brightness image in addition to the pattern projected image.

The head-side control section 30 is a member for controlling the image capturing part 10, as well as the first projector 20A and the second projector 20B which are the light projecting part 20. The head-side control section 30, for example, creates a light projection pattern for the light projecting part 20 projecting the measurement light to the workpiece to obtain the pattern projected image. The head-side control section 30 makes the image capturing part 10 capture a phase shift image while making the light projecting part 20 project a projection pattern for phase shifting, and further, makes the image capturing part 10 capture a spatial code image while making the light projecting part 20 project a projection pattern for spatial coding. In such a manner, the head-side control section 30 functions as a light projection controlling part for controlling the light projecting part such that the phase shift image and the spatial code image can be captured in the image capturing part 10.

The head-side computing section 31 includes a filter processing section 34 and a distance image generating part 32. The distance image generating part 32 generates the distance image based on the plurality of pattern projected images captured in the image capturing part 10.

A head-side storage part 38 is a member for holding a variety of settings, images and the like, and a storage element such as a semiconductor memory or a hard disk can be used. For example, it includes a brightness image storage section 38b for holding the pattern projected image captured in the image capturing part 10, and a distance image storage section 38a for holding the distance image generated in the distance image generating part 32.

The head-side communication part 36 is a member for communicating with the controller section 2. Here, it is connected with a controller-side communication part 42 of the controller section 2. For example, the distance image generated in the distance image generating part 32 is transmitted to the controller section 2.

(Distance Image Generating Part 32)

The distance image generating part 32 is a part for generating the distance image where the shade value of each pixel changes in accordance with the distance from the image capturing part 10, which captures the image of the workpiece WK, to the workpiece WK. For example, in the case of generating the distance image by the phase shift method, the head-side control section 30 controls the light projecting part 20 so as to project a sinusoidal fringe pattern to the workpiece while shifting its phase, and the head-side control section 30 controls the image capturing part 10 so as to capture a plurality of images with the phase of the sinusoidal fringe pattern shifted in accordance with the above shifting. Then, the head-side control section 30 finds a sinusoidal phase with respect to each pixel from the plurality of images, to generate the distance image through use of the found phases.

Further, in the case of generating the distance image by use of the spatial coding method, a space that is irradiated with light is divided into a large number of small spaces each having a substantially fan-like cross section, and these small spaces are provided with a series of spatial code numbers. For this reason, even when the height of the workpiece is large, in other words, even when the height difference is large, the height can be computed from the spatial code numbers so long as the workpiece is within the space irradiated with light. Hence it is possible to measure the whole shape of even the workpiece having a large height. Combining the phase shift method and the spatial coding method allows accurate measurement of a three-dimensional shape from a low portion to a high portion.

Generating the distance image on the head section side and transmitting it to the controller section in such a manner can lead to reduction in amount of data to be transmitted from the head section to the controller section, thereby avoiding a delay in the processing which can occur due to transmission of a large amount of data.

It is to be noted that, although the distance image generating processing is to be performed on the head section 1 side in the present embodiment, for example, the distance image generating processing can be performed on the controller section 2 side. Further, the tone conversion from the distance image to the low-tone distance image can be performed not only in the controller section but also on the head section side. In this case, the head-side computing section 31 realizes a function of the tone conversion part.

(Controller Section 2)

Further, the controller section 2 is provided with the controller-side communication part 42, a controller-side control section, a controller-side computing section, a controller-side storage part, an inspection executing part 50, and a controller-side setting part 41. The controller-side communication part 42 is connected with the head-side communication part 36 of the head section 1 and performs data communication. The controller-side control section is a member for controlling each member. The controller-side computing section realizes a function of an image processing section 60.

The image processing section 60 realizes functions of an image searching part 64, the tone converting part 46, and the like.

(Tone Converting Part)

Based on the distance image, the tone converting part 46 tone-converts the high-tone distance image to the low-tone distance image (its procedure will be detailed later). Herewith, the distance image having the height information generated in the head section is expressed as a low-tone shade image that can also be handled by existing image processing, and this can contribute to the measurement processing and the inspection processing. Further, there can also be obtained an advantage of being able to disperse a load by making the distance image generating processing and the tone conversion processing shared by the head section and the controller section. It is to be noted that in addition to the distance image, the low-tone distance image may also be generated on the head section side. Such processing can be performed in the head-side computing section. This can further alleviate the load on the controller section side, to allow an efficient operation.

Further, the tone converting part does not tone-convert the whole of the distance image, but preferably selects only a necessary portion thereof and tone-converts it. Specifically, it tone-converts only a portion corresponding to an inspection target region previously set by an inspection target region setting part (detailed later). In such a manner, the processing for converting the multi-tone distance image to the low-tone distance image is restricted only to the inspection target region, thereby allowing alleviation of the load necessary for the tone conversion. Moreover, this also contributes to reduction in processing time. That is, improving the reduction in processing time can lead to preferable use in an application with limited processing time, such as an inspection in a FA application, thereby to realize real-time processing.

The controller-side storage part is a member for holding a variety of settings and images, and the semiconductor storage element, the hard disk, or the like can be used.

The controller-side setting part 41 is a member for performing a variety of settings to the controller section, and accepts an operation from the user via the input part 3 such as a console connected to the controller section, to instruct a necessary condition and the like to the controller side. For example, it realizes functions of a tone conversion condition setting part 43, a reference plane specifying part 44, a spatial coding switching part 45, an interval equalization processing setting part 47, a light projection switching part 48, a shutter speed setting part 49, and the like.

The inspection executing part 50 executes predetermined inspection processing on the low-tone distance image tone-converted in the tone converting part 46.

(Hardware Configuration)

Figure 9:
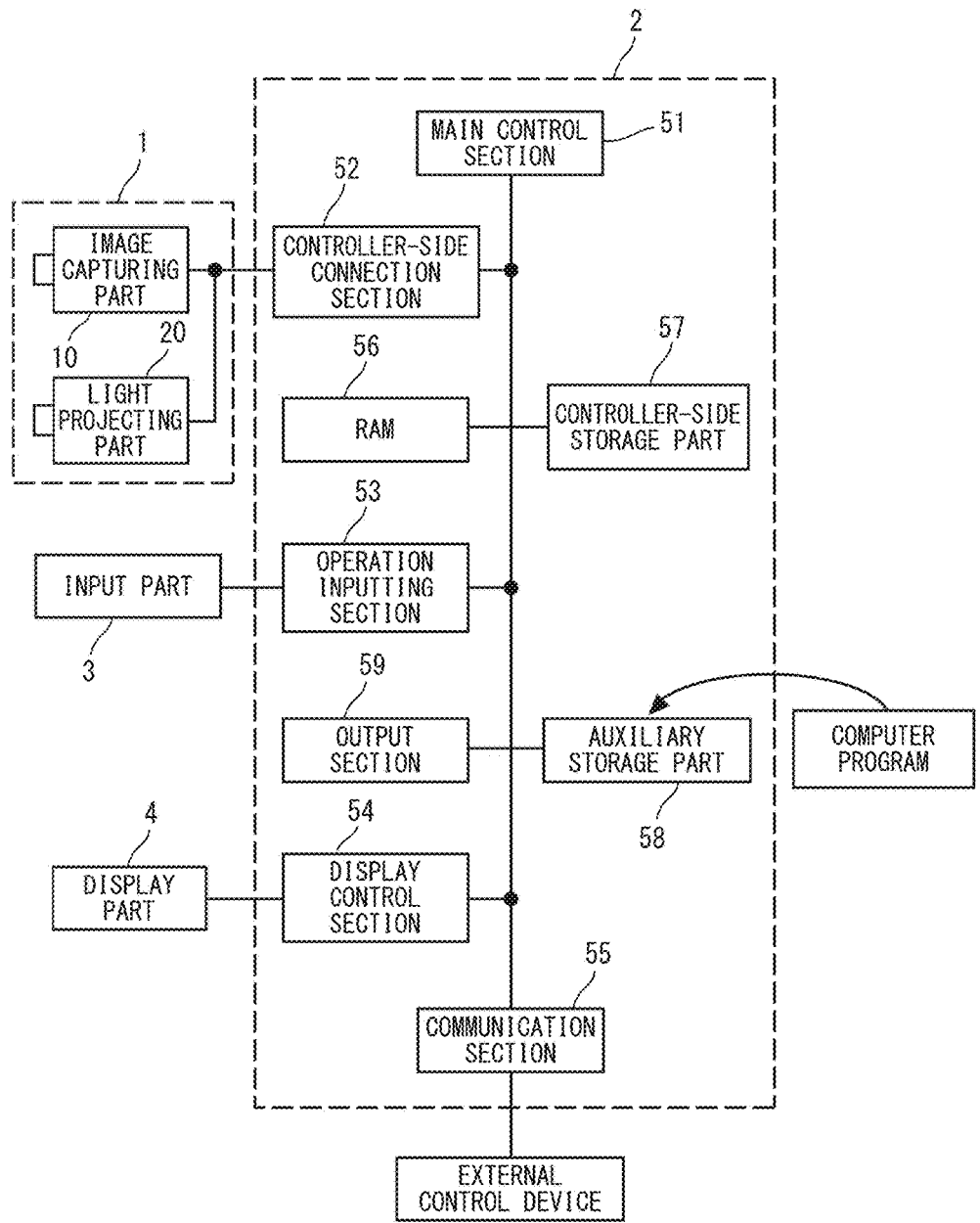
FIG. 9 is a block diagram showing a controller section of FIG. 5.

Next, a constitutional example of hardware of the controller section 2 is shown in a block diagram of FIG. 9. The controller section 2 shown in this drawing has a main control section 51 for performing control of each section of the hardware while performing numerical value calculation and information processing based on a variety of programs. The main control section 51, for example, has a CPU as a central processing part, a working memory such as a RAM that functions as a working area for the main control section 51 at the time of executing a variety of programs, a program memory such as a ROM, a flash ROM or an EEPROM where a start-up program, an initialization program and the like are stored.

Further, the controller section 2 is provided with: a controller-side connection section 52 for connecting with the head section 1 that includes the image capturing part 10, the light projecting part 20 and the like, controlling the light projecting part 20 so as to project light with a sinusoidal fringe pattern to the workpiece while shifting its phase, and fetching image data obtained by the image capturing in the image capturing part 10; an operation inputting section 53 which is inputted with an operation signal from the input part 3; a display controlling section 54 configured of a display DSP that allows the display part 4, such as the liquid crystal panel, to display an image, and the like; a communication section 55 communicably connected to the external PLC 70, the personal computer PC and the like; a RAM 56 for holding temporary data; a controller-side storage part 57 for storing a setting content; an auxiliary storage part 58 for holding data set by means of the three-dimensional image processing program installed in the personal computer PC; an image processing section 60 configured of a computing DSP that executes the measurement processing such as the edge detection and the area calculation, and the like; an output section 59 for outputting a result of performing a predetermined inspection based on a result of the processing in the image processing section 60, or the like; and some other section. Each of the above hardware is communicably connected via an electric communication path (wiring) such as a bus.

In the program memory in the main control section 51, there is stored a control program for controlling each of the controller-side connection section 52, the operation inputting section 53, the display controlling section 54, the communication section 55 and the image processing section 60 by a command of the CPU, or the like. Further, the foregoing processing sequence program, namely the processing sequence program generated in the personal computer PC and transmitted from the personal computer PC, is stored into the program memory.

The communication section 55 functions as an interface (I/F) that receives an image capturing trigger signal from the PLC 70 at the time when a trigger is inputted in a sensor (photoelectronic sensor, etc.) connected to the external PLC 70. Further, it also functions as an interface (I/F) that receives the three-dimensional image processing program transmitted from the personal computer PC, layout information that prescribes a display mode of the display part 4, and the like.

When the CPU of the main control section 51 receives the image capturing trigger signal from the PLC 70 via the communication section 55, it transmits an image capturing command to the controller-side connection section 52. Further, based on the processing sequence program, it transmits to the image processing section 60 a command to instruct image processing to be executed. It should be noted that such a configuration can be formed where, as the apparatus for generating the image capturing trigger signal, not the PLC 70 but a trigger inputting sensor such as a photoelectronic sensor may be directly connected to the communication section 55.

The operation inputting section 53 functions as an interface (I/F) for receiving an operation signal from the input part 3 based on a user's operation. A content of the user's operation by use of the input part 3 is displayed on the display part 4. For example, in the case of using the console as the input part 3, each component such as a cross key for vertically and horizontally moving a cursor that is displayed on the display part 4, a decision button or a cancel button can be disposed. By operating each of these components, the user can, on the display part 4, create a flowchart that prescribes a processing sequence for image processing, edit a parameter value of each image processing, set a reference region, and edit a reference registered image.

The controller-side connection section 52 fetches image data. Specifically, for example, when receiving the image capturing command for the image capturing part 10 from the CPU, the controller-side connection section 52 transmits an image data fetching signal to the image capturing part 10. Then, after image capturing has been performed in the image capturing part 10, it fetches image data obtained by the image capturing. The fetched image data is once stored in a buffer (cache), and substituted in a previously prepared image variable. It should be noted that, differently from a normal variable dealing with a numerical value, the "image variable" refers to a variable allocated as an input image of a corresponding image processing unit, to be set as a reference destination of measurement processing or image display.

The image processing section 60 executes the measurement processing on the image data. Specifically, first, the controller-side connection section 52 reads the image data from a frame buffer while referring to the foregoing image variable, and internally transmits it to a memory in the image processing section 60. Then, the image processing section 60 reads the image data stored in the memory and executes the measurement processing. Further, the image processing section 60 includes the tone converting part 46, an abnormal point highlight part 62, the image searching part 64, and the like.

Based on a display command transmitted from the CPU, the display controlling section 54 transmits to the display part 4 a control signal for displaying a predetermined image (video). For example, it transmits the control signal to the display part 4 in order to display image data before or after the measurement processing. Further, the display controlling section 54 also transmits a control signal for allowing the content of the user's operation by use of the input part 3 to be displayed on the display part 4.

The head section 1 and the controller section 2 made up of such hardware as above are configured to be able to realize each part or function of FIG. 5 by way of a variety of programs in forms of software. In this example, there is adopted the mode of installing the three-dimensional image processing program into the computer of FIG. 1 to perform a setting necessary for the three-dimensional image processing.

(Tone Conversion)

The above three-dimensional image processing apparatus acquires a distance image of the workpiece, performs image processing on this distance image, and inspects its result. The three-dimensional image processing apparatus according to the present embodiment can execute two sorts of inspections: image inspection processing for performing computing by use of information of an area, an edge or the like by means of existing hardware, on top of height inspection processing for performing computing by use of height information as it is as a pixel value of the distance image. Here, for sustaining the accuracy in height inspection processing, it is necessary to generate a multi-tone distance image. On the other hand, the image inspection processing cannot be executed on such a multi-tone distance image by means of the existing hardware. Therefore, in order to perform the image inspection processing by use of the existing hardware, the multi-tone distance image is subjected to the tone conversion, to generate a low-tone distance image.

However, when height information of the multi-tone distance image is converted as it is to the low-tone distance image, the accuracy of the height information is lost, which is problematic. Many of general images used in the FA application or the like are images each expressing a shade value by 8 tones in monochrome. As opposed to this, the high-tone image such as a 16-tone image is used as the distance image. For this reason, at the time of tone-converting the multi-tone distance image to the low-tone distance image, a considerable amount of height information is lost, which affects the accuracy in inspection. Having said that, increasing the number of tones of the image handled in the existing image processing for enhancing the accuracy results in a steep rise of introduction cost and an increased processing load, making its use more difficult.

Accordingly, at the time of the tone conversion as thus described, it is necessary to set such a condition for the tone conversion as to sustain necessary height information. Hereinafter, a method and a sequence therefor will be described in detail.

(Height Inspection or Image Inspection)

Figure 10:
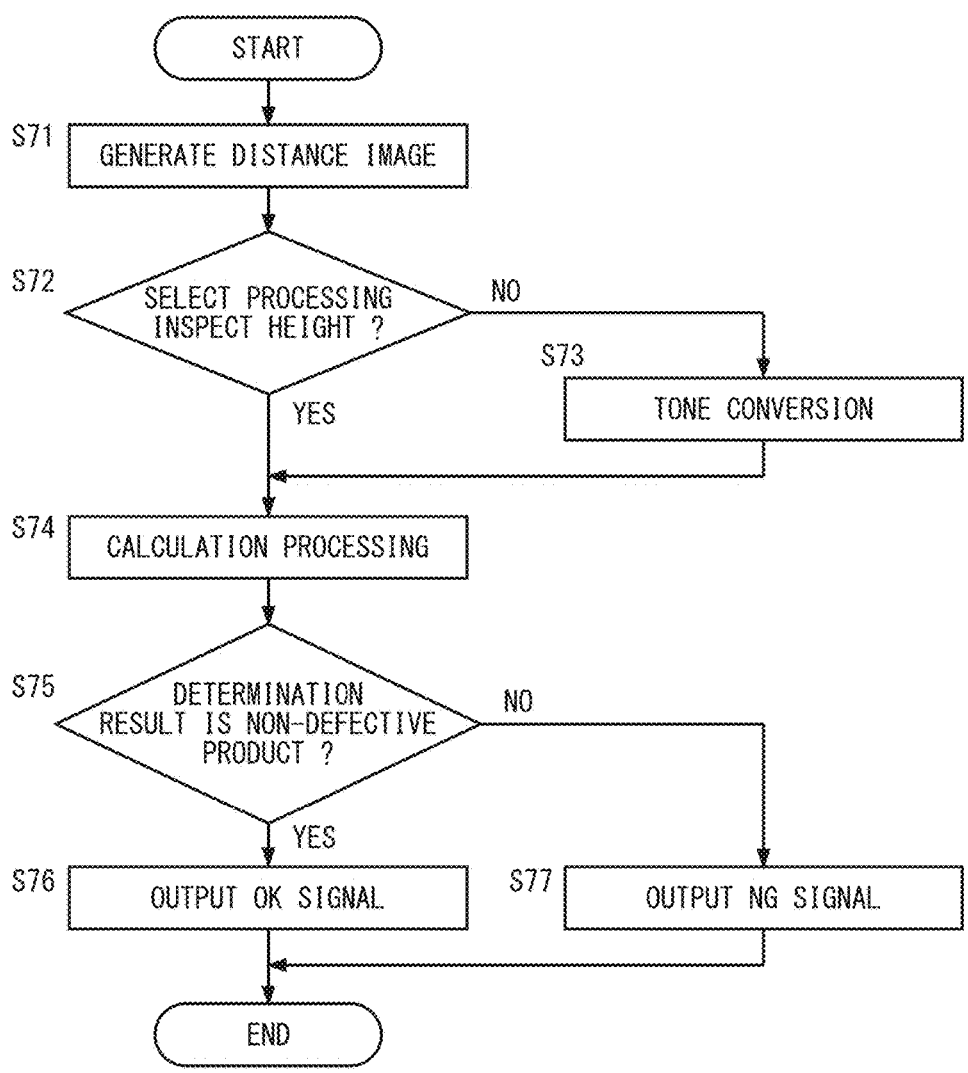
FIG. 10 is a flowchart showing a processing operation of the image processing apparatus according to the present embodiment.

First, a description will be given of a processing operation of performing the height inspection processing by use of the three-dimensional image processing apparatus based on a flowchart of FIG. 10. This three-dimensional image processing apparatus is provided with, as tools for performing calculation processing, a height inspection processing tool for performing the height inspection on the distance image, and a variety of image inspection processing tools for performing the image inspection on the existing brightness image. Here, the height inspection processing will be described.

First, a distance image is generated (Step S71). Specifically, the distance image generating part 32 generates the distance image by use of the image capturing part 10 and the light projecting part 20. Subsequently, desired calculation processing is selected (Step S72). Here, a tool necessary for the calculation processing is selected.

In the case of selecting the inspection processing tool, the processing goes to Step S73, and the tone conversion processing is performed on the high-tone distance image obtained in Step S71 above, to convert it to a low-tone distance image. This makes it possible for even an inspection processing tool in the existing image processing apparatus to handle a low-tone distance image. It is to be noted that the tone conversion processing is not performed in the whole region of the high-tone distance image, but is preferably performed only within an inspection target region having been set for the image inspection processing.

Meanwhile, in the case of selecting the height inspection tool, since height information in the multi-tone distance image is used as it is, the processing goes to Step S74 without performing the tone conversion.

Further, the inspection executing part 50 performs a variety of calculation processing (Step S74), and then determines whether or not the workpiece is a non-defective product based on a result of the calculation (Step S75). When it is determined by the inspection executing part 50 that the workpiece is a non-defective product (Step S75: YES), a determination signal outputting part 160 outputs an OK signal as a determination signal to the PLC 70 (Step S76), and when it is determined by the inspection executing part 50 that the workpiece is not a non-defective product, namely a defective product (Step S75: NO), the determination signal outputting part 160 outputs an NG signal as a determination signal to the PLC 70 (Step S77).

(Incorrect-Height Determining Function)

Figure 11:
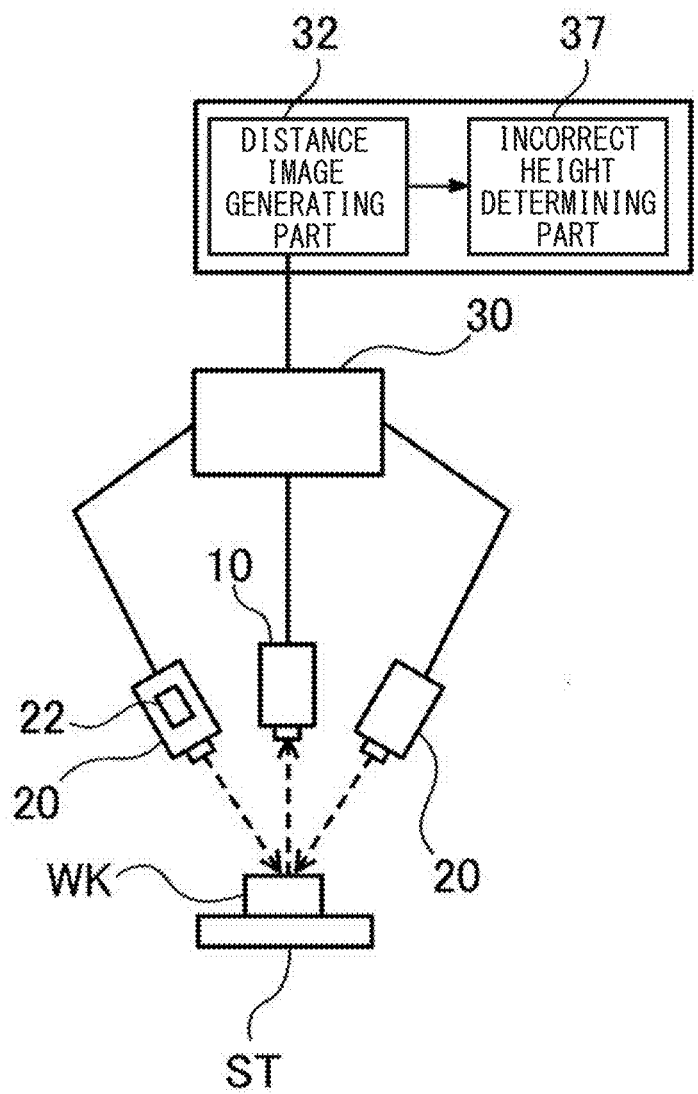
FIG. 11 is a block diagram showing three-dimensional image processing according to an embodiment of the present invention.

The three-dimensional image processing apparatus is further provided with an incorrect-height determining function of detecting that an incorrect value different from original height information of the workpiece is detected due to multi-reflection when the workpiece is irradiated with a projection pattern and a pattern projected image is captured. A block diagram of FIG. 11 shows an example of such a three-dimensional image processing apparatus. The three-dimensional image processing apparatus shown in this drawing is provided with the light projecting parts 20, the image capturing part 10, a head-side control section for controlling the light projecting parts 20 and the image capturing part 10, and a head-side computing section. The head-side computing section is provided with the distance image generating part 32 and an incorrect-height determining part 37. By combining the phase shift method and the spatial coding method, the distance image generating part 32 can obtain a distance image that includes height information with high accuracy in a relatively short period of time. The pattern generating part 22 generates a first projection pattern and a second projection pattern whose fringe direction is different from that of the first projection pattern as a plurality of projection patterns obtained by changing a fringe direction of the projection pattern. The incorrect-height determining part 37 makes comparison in height information of a corresponding portion of the workpiece WK between a first distance image, generated in the distance image generating part 32 based on a first pattern projected image obtained by projecting from the light projecting parts 20 the first projection pattern generated in the pattern generating part 22 and capturing an image thereof in the image capturing part 10, and a second distance image, generated based on a second pattern projected image obtained by the second projection pattern projected from the common light projecting parts 20, to determine height information of a portion where a difference not smaller than a predetermined value has occurred as incorrect.

In such a manner, by projecting different projection patterns from the same light projecting part 20 and computing pieces of height information thereof, the same height information is obtained from either projection pattern in the case of a normal result, whereas different pieces of height information are obtained depending on the projection pattern when multi-reflection, such as mirror reflection, has occurred. Accordingly, by comparing pieces of height information computed with the respective projection patterns, in the case of existence of a portion where a remarkable difference is seen, it can be determined that the multi-reflection has occurred and correct height information has not been obtained in the portion. In such a manner, a portion where an incorrect measurement result has occurred due to the mirror reflection or the like can be detected, which has hitherto been difficult, and the portion where it has occurred can further be specified, thereby to allow improvement in reliability of a measurement result.

(Pattern Generating Part 22)

The first projection pattern and the second projection pattern are projected from the same light projecting part 20, namely a light source, to capture projection pattern images. It is to be noted that for the purpose of reducing computational processing, two kinds of projection patterns are preferably projected, but it is also possible to employ a configuration where three or more kinds of projection patterns are projected and pieces of height information obtained from the respective projection pattern images are compared. However, when the number of projection pattern is large, it takes a long time to perform irradiation with the projection patterns, capture projection pattern images and compute height information.

Figure 12:
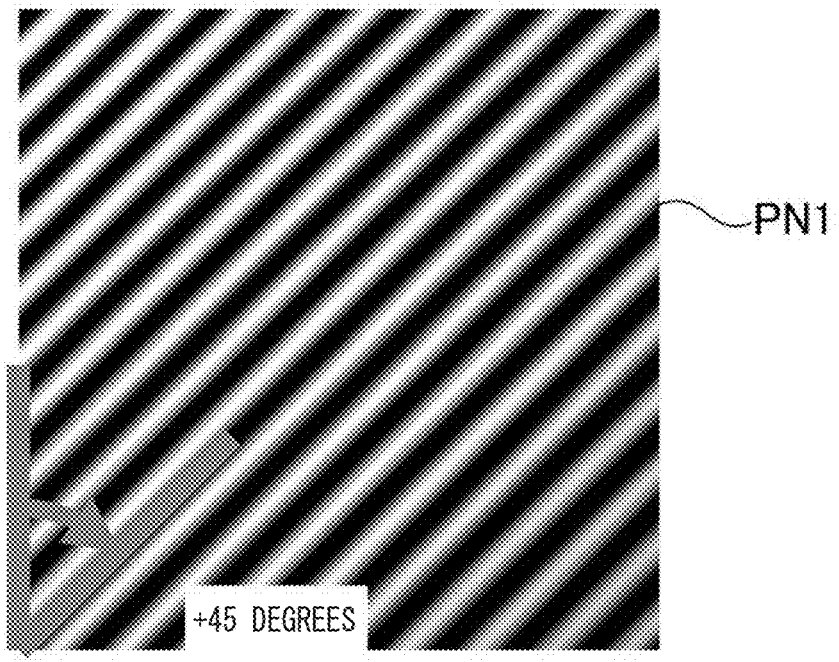
FIG. 12 is an image view showing a first projection pattern.
Figure 13:
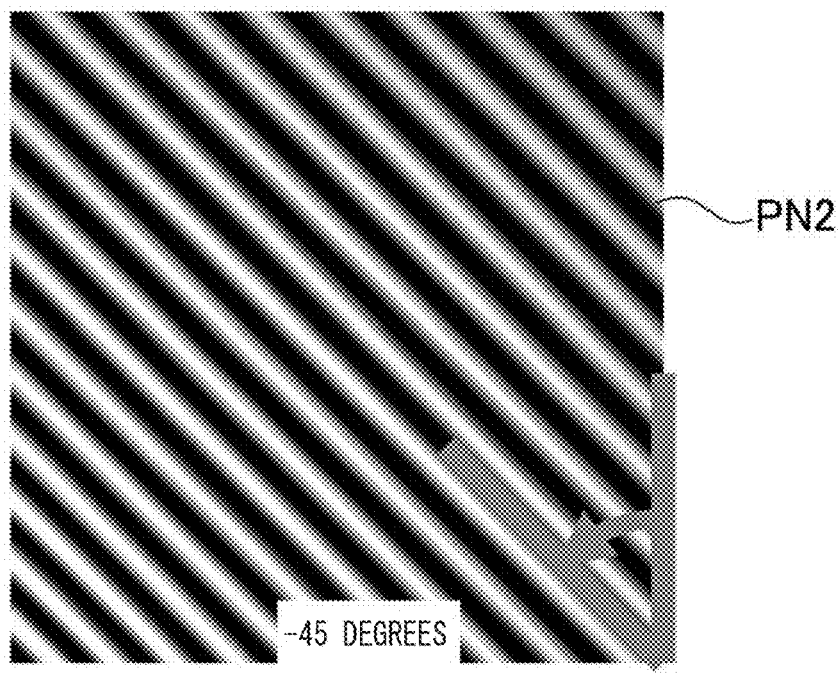
FIG. 13 is an image view showing a second projection pattern.
Figure 24:
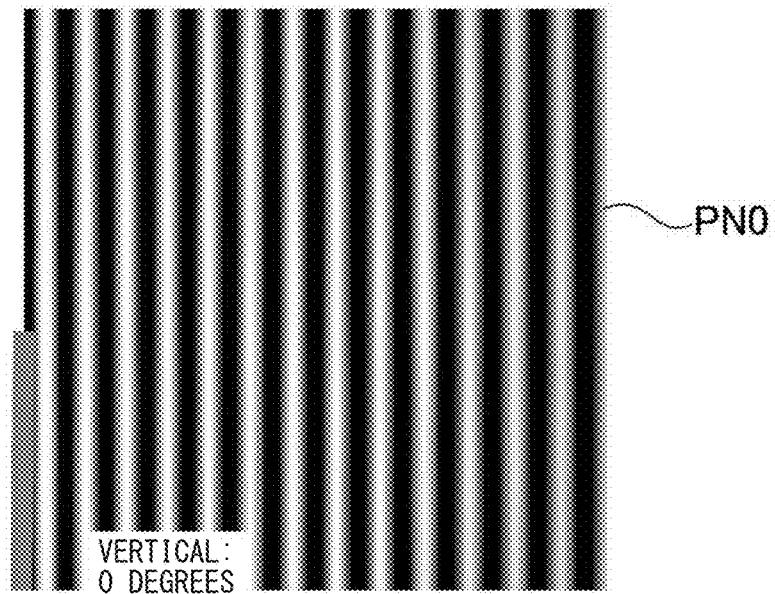
FIG. 24 is an image view showing an example of a fringe pattern.
Figure 25:
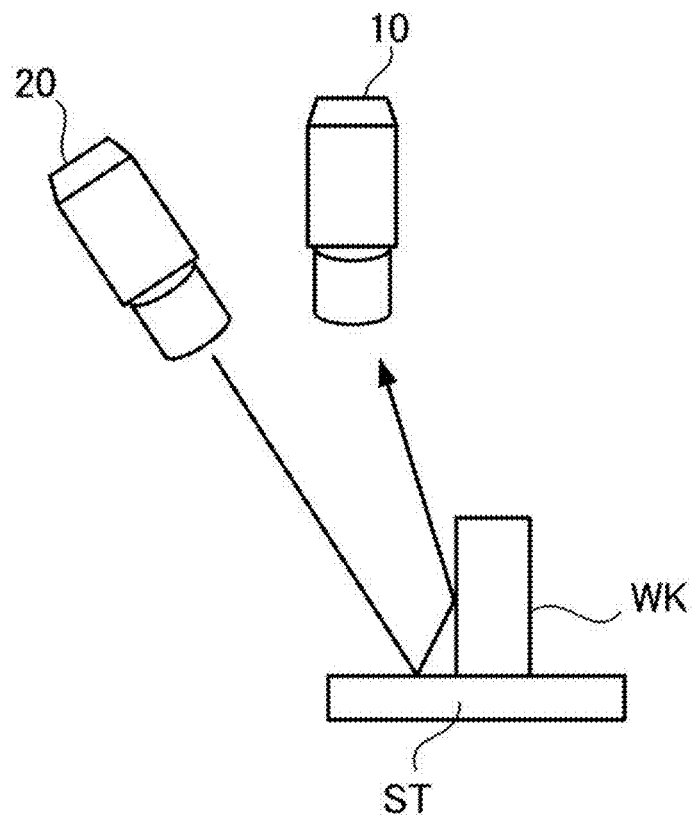
FIG. 25 is a schematic view showing a situation where a portion of a workpiece which has an acute angle is observed.

Here, as examples of the projection pattern generated by the pattern generating part 22, FIG. 12 shows a first projection pattern PN1 and FIG. 13 shows a second projection pattern PN2. In these examples, the first projection pattern PN1 is inclined by +45° with respect to a vertical direction as compared with a conventional projection pattern PN0 shown in FIG. 24. On the other hand, the second projection pattern PN2 is inclined by −45°. For drawing the projection patterns as thus inclined, a DMD arranged with micro-mirrors in a diamond shape as in FIGS. 6 and 7 described above can be preferably used. In addition, as for an angle of inclination of each of the first projection pattern and the second projection pattern, it is enough if each pattern is inclined. Conversely, each pattern functions unless being a vertical or horizontal pattern, and the angle of inclination thereof does not matter. However, in the case of the patterns inclined by ±45° as described above, there can be obtained an advantage of facilitating constituting a neat fringe pattern by means of the DMD arranged with micro-mirrors each formed in a diamond shape. Further, the first projection pattern and the second projection pattern are preferably linearly symmetrical patterns.

Figure 14:
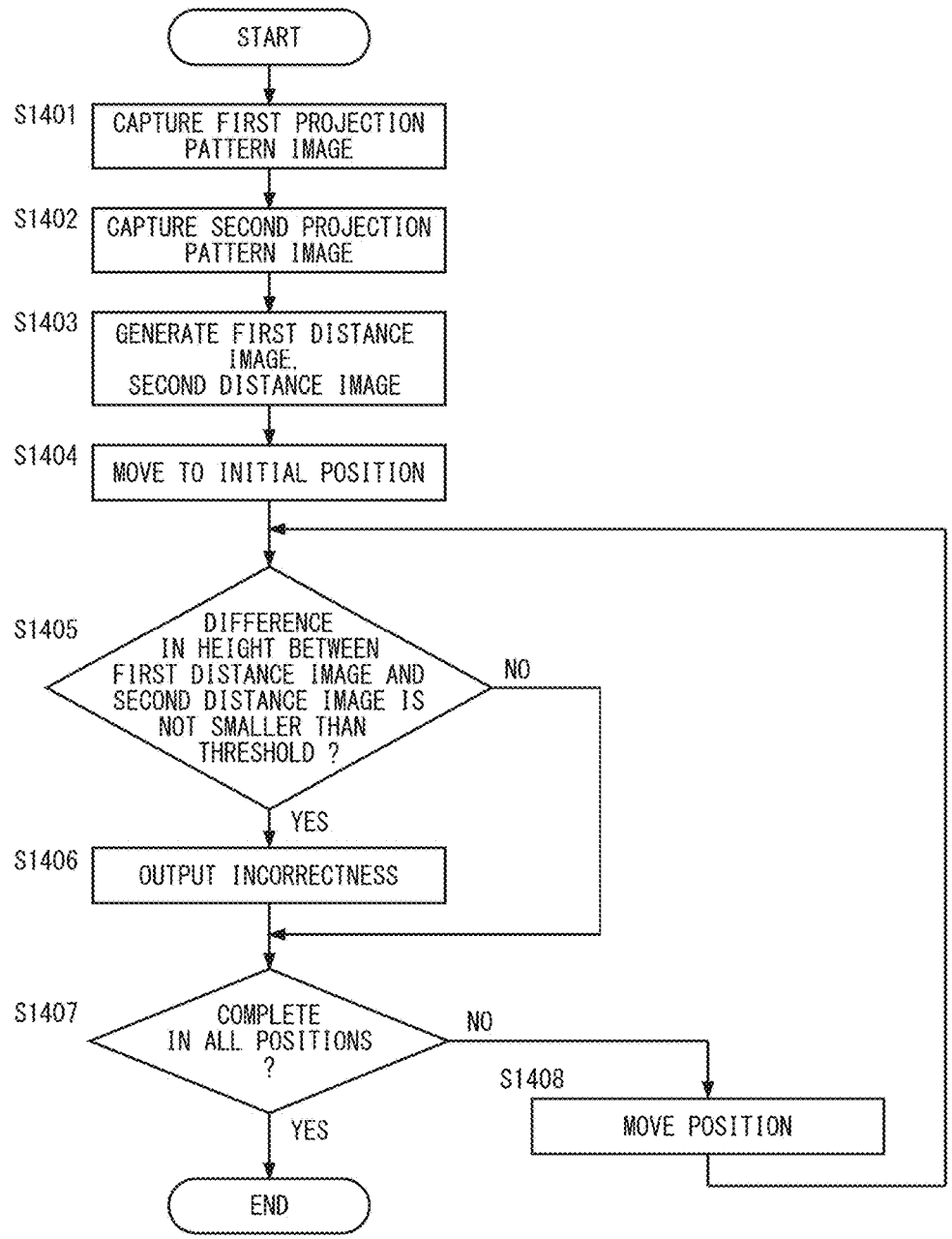
FIG. 14 is a flowchart showing a procedure for executing incorrect-height determination.
Figure 15B:
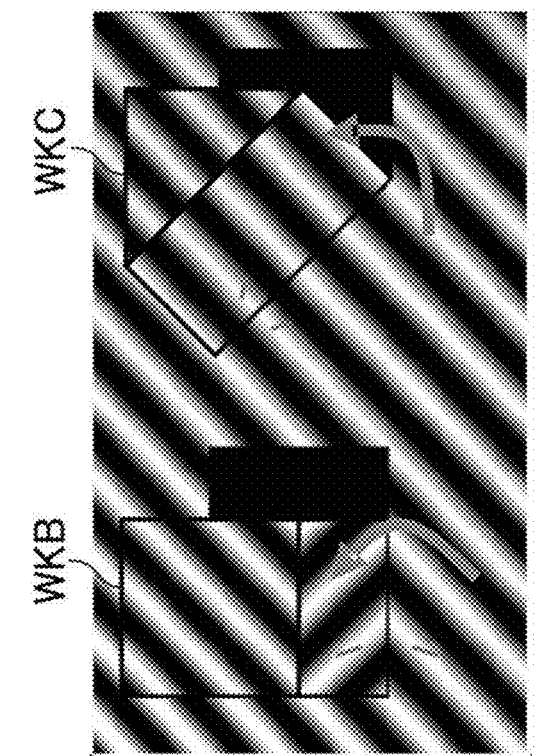
FIG. 15B is an image view showing the first projection pattern image.
Figure 15A:
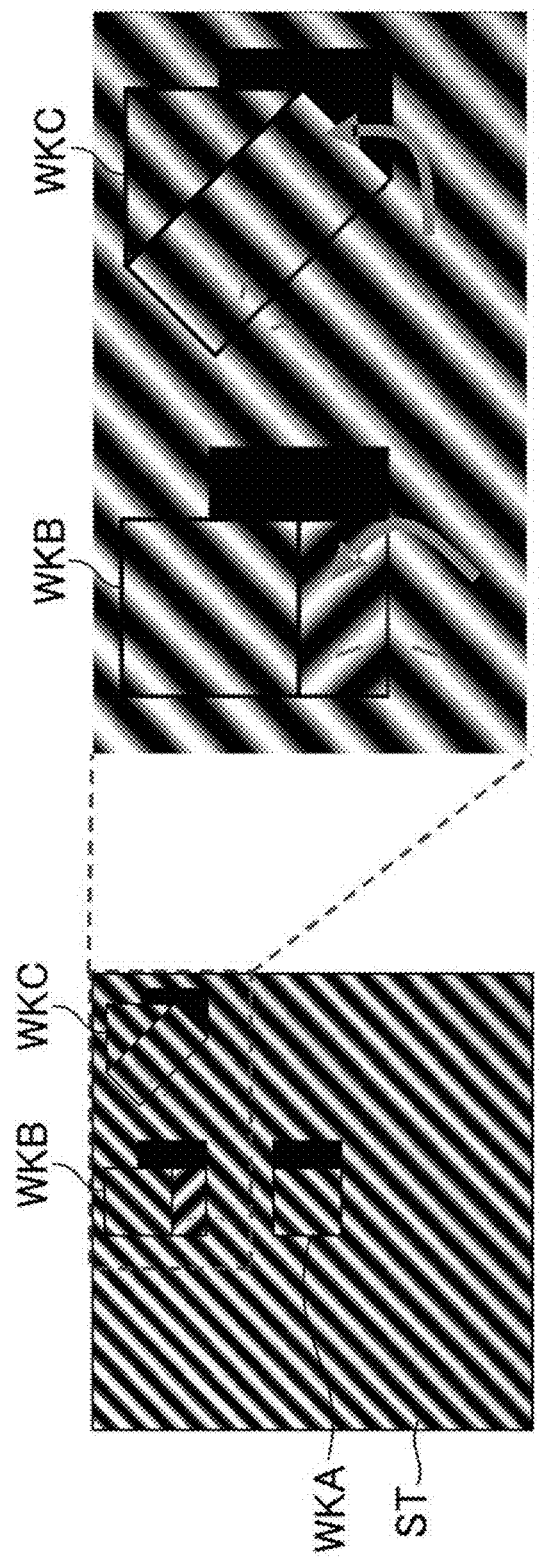
FIG. 15A is an image view showing a first projection pattern image with respect to workpieces of FIG. 27.
Figure 26:
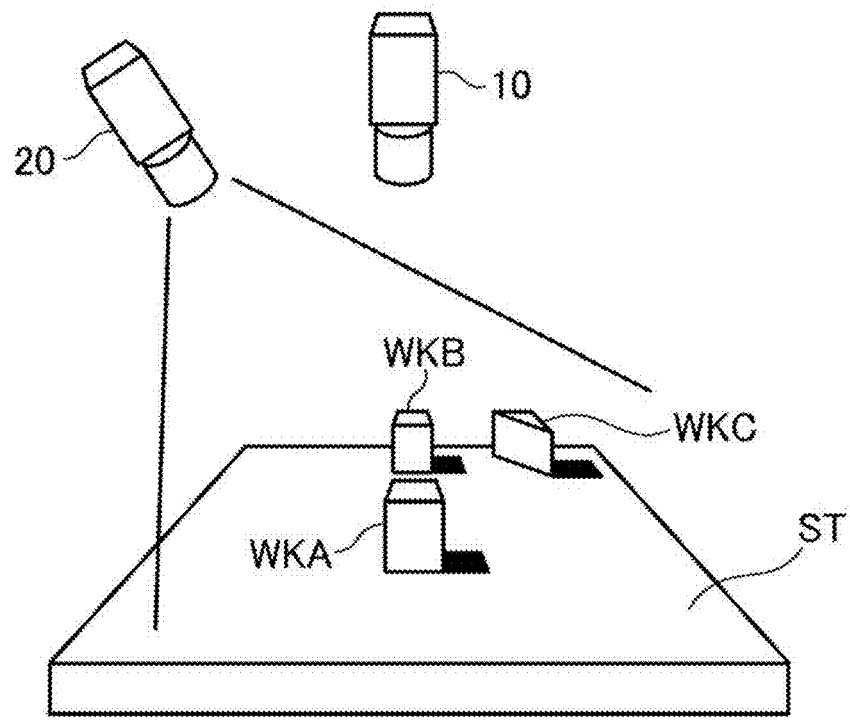
FIG. 26 is a schematic view showing a positional relation among the workpieces, a camera and a projector.
Figure 27:
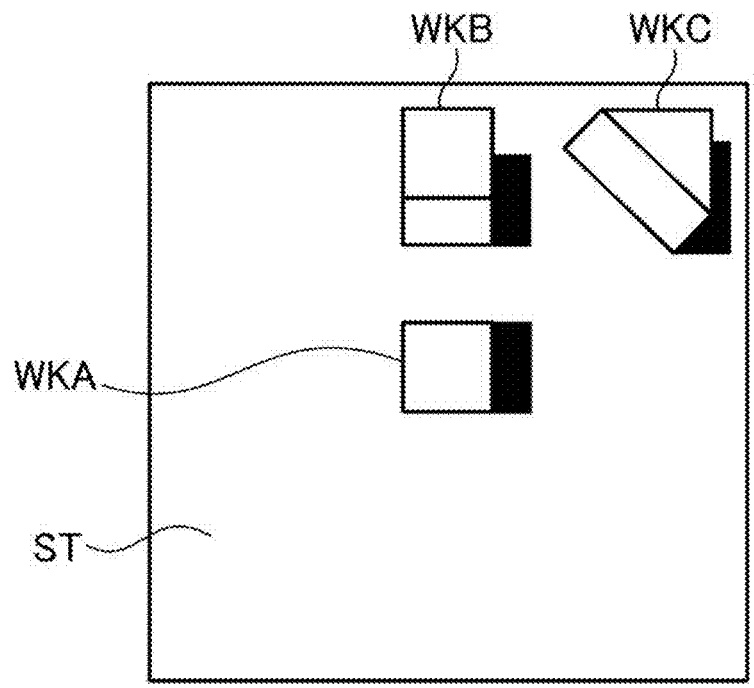
FIG. 27 is a schematic view showing a state where the workpieces are seen from the camera of FIG. 26.
Figure 28:
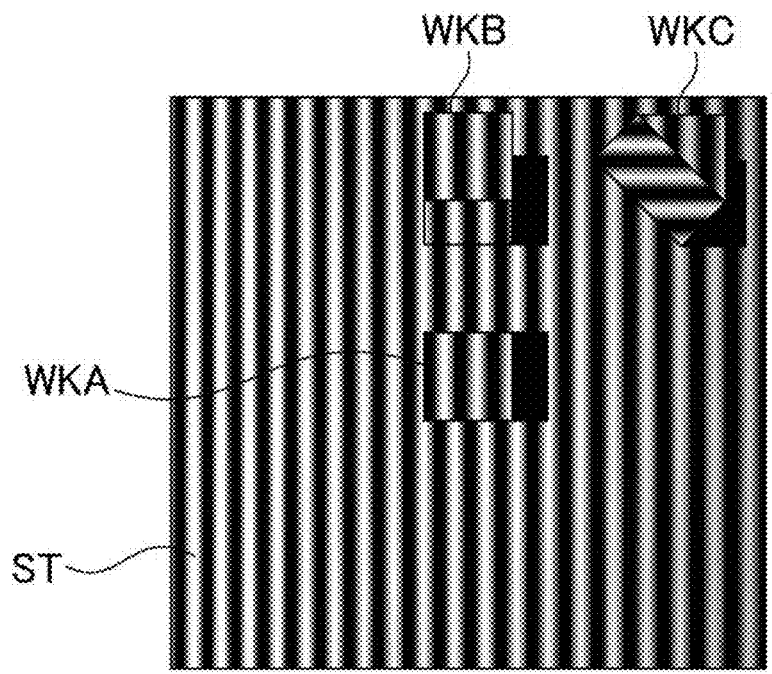
FIG. 28 is an image view showing a projection pattern image obtained by projecting the projection pattern of FIG. 24 to the workpieces of FIG. 27.
Figure 29:
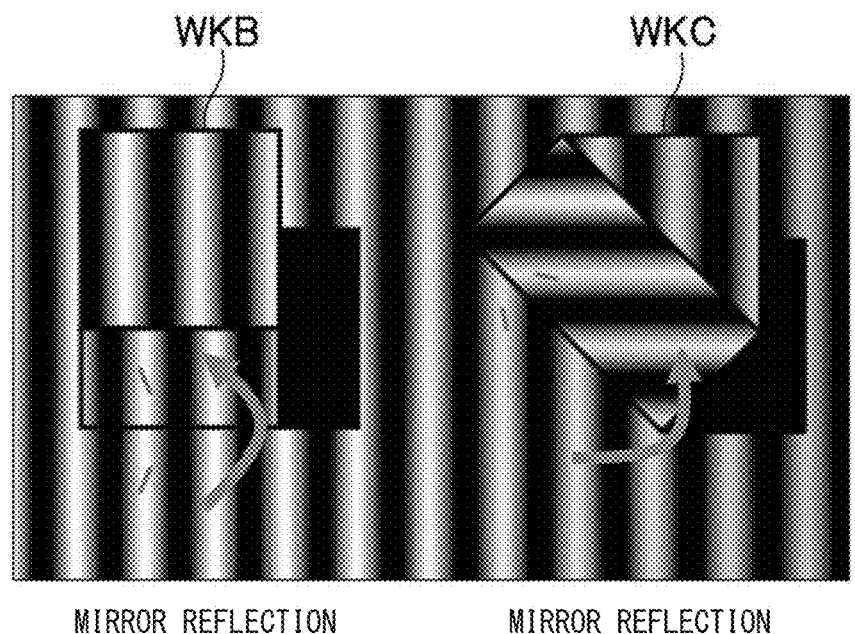
FIG. 29 is an enlarged view showing the workpiece WKB and the workpiece WKC of the projection pattern image of FIG. 28.
Figure 30A:
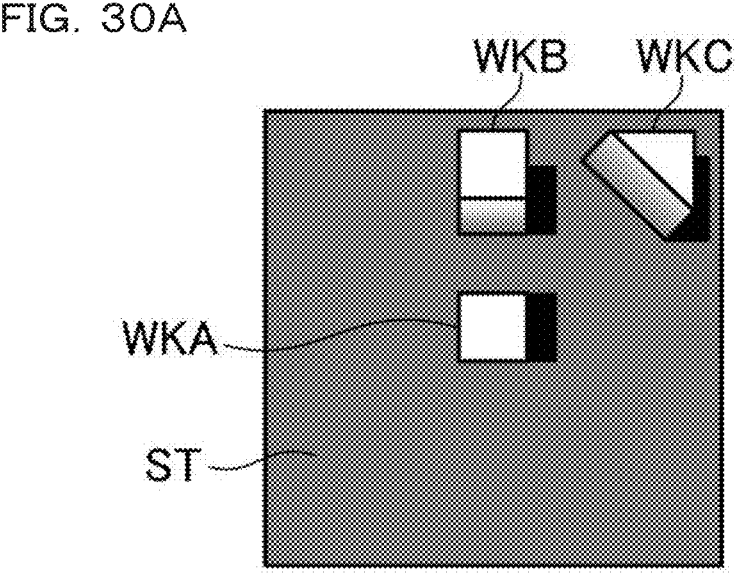
FIG. 30A is an image view showing a distance image that should originally be obtained with respect to the workpieces of FIG. 27.
Figure 30B:
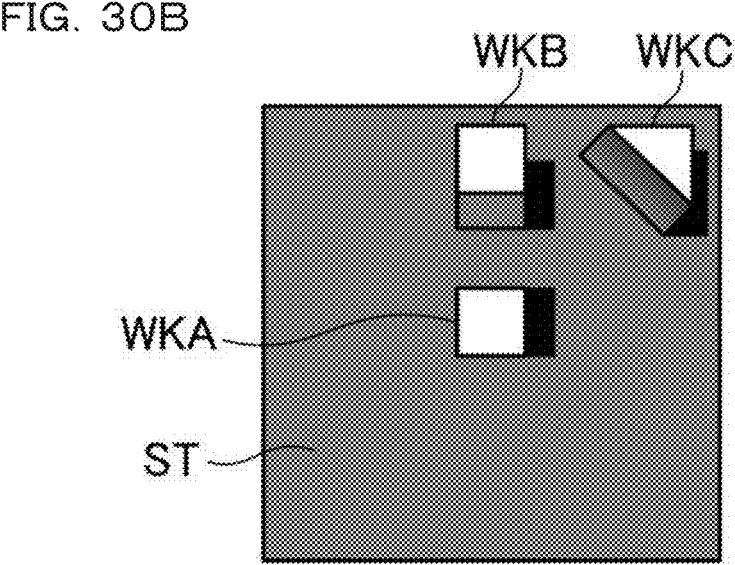
FIG. 30B is an image view showing an incorrect distance image obtained due to the mirror reflection.
Figure 31A:
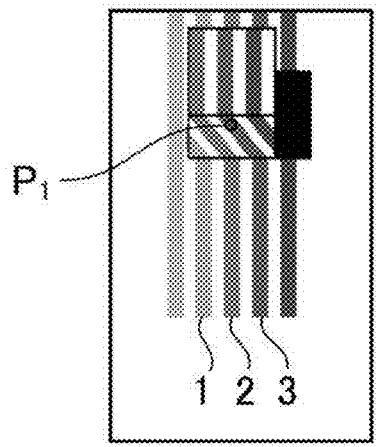
FIG. 31A is a normal projection pattern with respect to the workpiece WKB of FIG. 27.
Figure 31B:
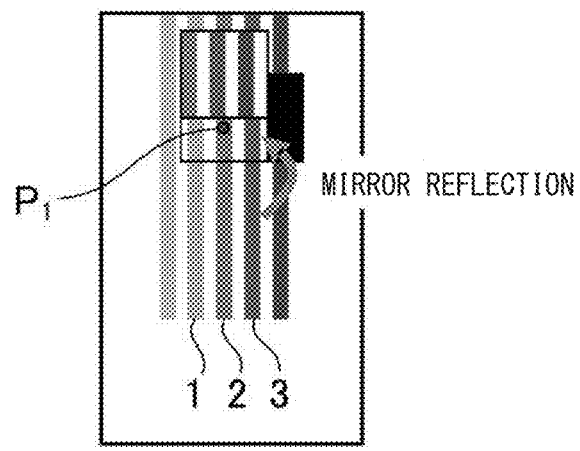
FIG. 31B is a projection pattern where the mirror reflection has occurred with respect to the workpiece WKB.
Figure 31C:
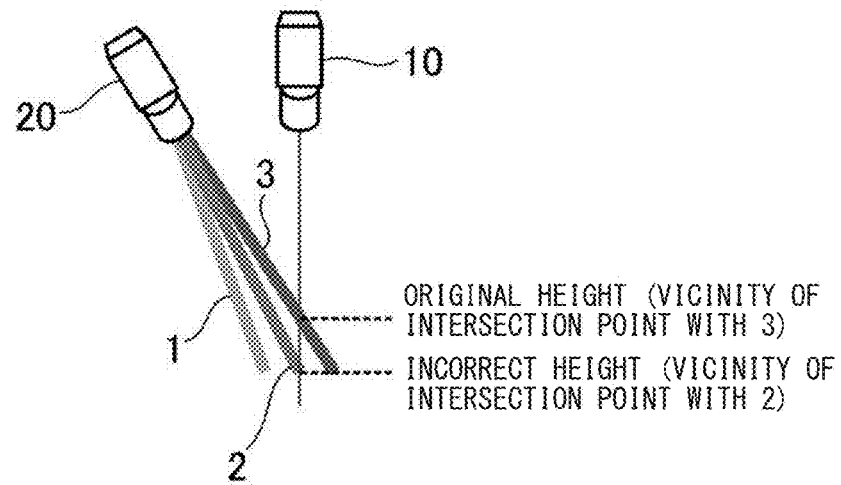
FIG. 31C is a schematic view showing measured height information.
Figure 32A:
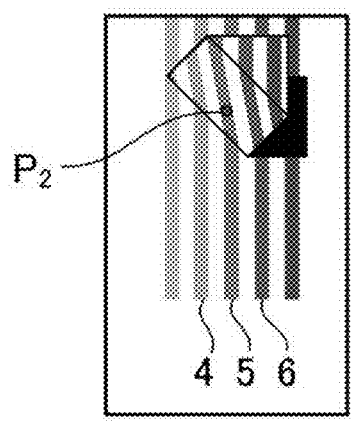
FIG. 32A is a normal projection pattern with respect to the workpiece WKC of FIG. 27.
Figure 32B:
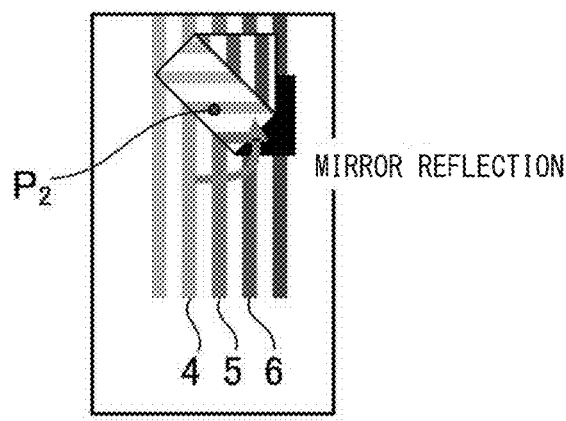
FIG. 32B is a projection pattern where the mirror reflection has occurred with respect to the workpiece WKC.
Figure 32C:
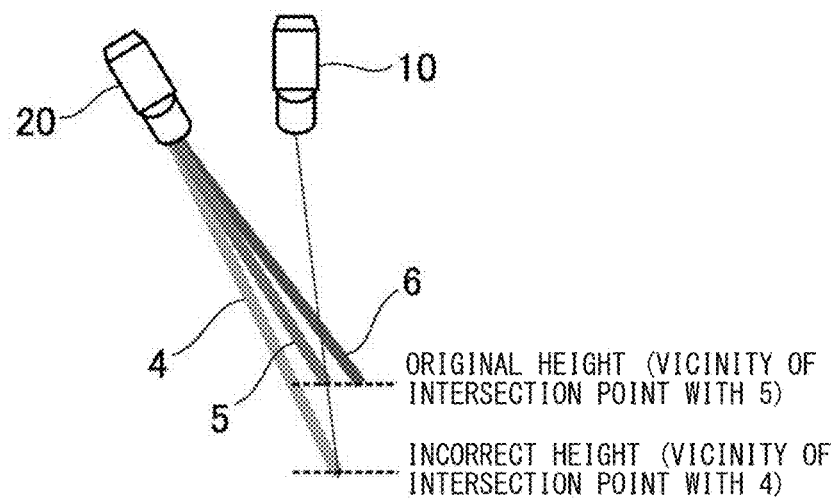
FIG. 32C is a schematic view showing measured height information.

Next, based on a flowchart of FIG. 14, a description will be given below of a procedure for capturing images of the workpieces WKA, WKB and WKC as shown in FIGS. 26 and 27 by use of the projection patterns of FIGS. 12 and 13, to perform incorrect-height determination. First, in Step S1401, the workpieces are irradiated with a plurality of patterns by the phase shift method and the spatial coding method along a direction of the first projection pattern, to capture a first projection pattern image group. Here, as shown in FIG. 26, the workpieces WKA, WKB and WKC are irradiated with the first projection pattern from the light projecting part 20, to capture a first projection pattern image in the image capturing part 10. FIGS. 15A and 15B show an example of the obtained first projection pattern image. In these drawings, it can be confirmed that the mirror reflection has occurred on the side surfaces of the workpiece WKB and the workpiece WKC as indicated by arrows in an enlarged view of FIG. 15B.

Figure 16B:
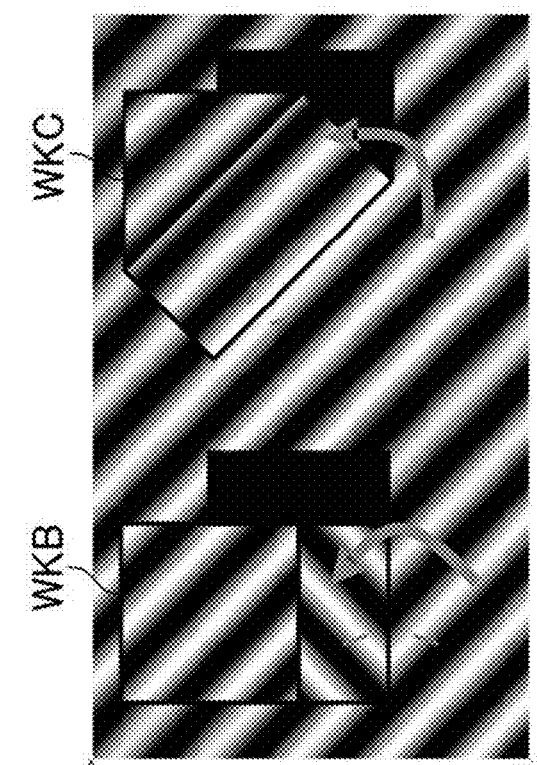
FIG. 16B is an image view showing the second projection pattern image.
Figure 16A:
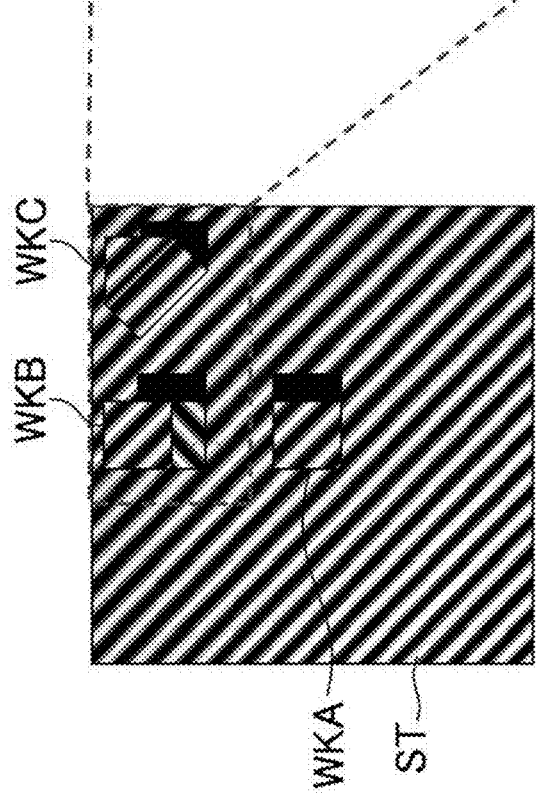
FIG. 16A is an image view showing a second projection pattern image with respect to the workpieces of FIG. 27.

Next, in Step S1402, the workpieces are irradiated with a plurality of patterns from the same light projecting part 20 by the phase shift method and the spatial coding method along a direction of the second projection pattern this time, to capture a second projection pattern image group. FIGS. 16A and 16B show an example of the obtained second projection pattern image. Also here, it can be confirmed that the mirror reflection has occurred on the side surfaces of the workpiece WKB and the workpiece WKC as indicated in an enlarged view of FIG. 16B. It should be noted that, when compared with the first projection pattern images of FIGS. 15A and 15B, the fringe pattern is naturally different therebetween.

Further in Step S1403, a first distance image and a second distance image each including height information are generated in the distance image generating part 32 from the first projection pattern image group and the second projection pattern image group, respectively. As a result, height information of each portion of the workpieces is obtained. In addition, the first distance image and the second distance image are generated after the first projection pattern image group and the second projection pattern image group have been captured in this example, but it is also possible to first capture the first projection pattern image group and generate the first distance image, and thereafter capture the second projection pattern image group and generate the second distance image.

Figure 17A:
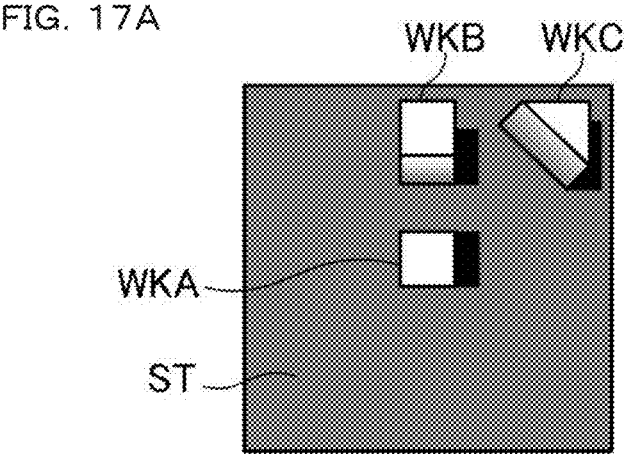
FIG. 17A shows an image view of an original distance image of the workpieces of FIG. 27.
Figure 17B:
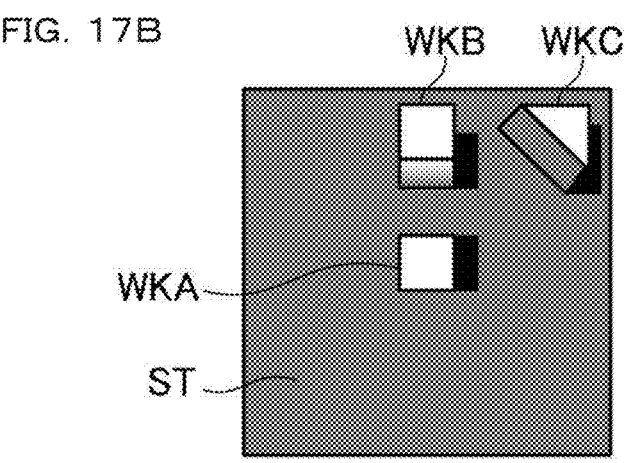
FIG. 17B shows an image view of a distance image obtained from the first projection pattern image.
Figure 17C:
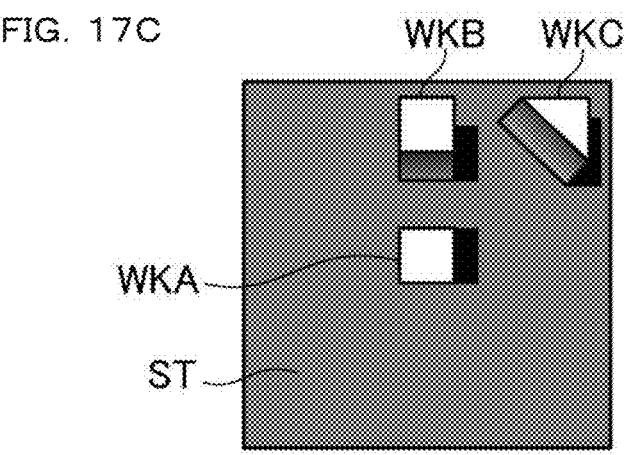
FIG. 17C shows an image view of a distance image obtained from the second projection pattern image.

FIGS. 17A, 17B and 17C show the obtained pieces of height information as images of the workpieces. In these drawings, FIG. 17A shows original heights of the workpieces, FIG. 17B shows heights obtained from the first projection pattern image, and FIG. 17C shows heights obtained from the second projection pattern image. As apparent by comprising these, it is found that incorrect heights have been detected on the side surface of the workpiece WKB and the side surface of the workpiece WKC, and normal height information has been detected in the other portion. Specifically, according to the height information computed from the first projection pattern image shown in FIG. 17B, a result close to the actual height shown in FIG. 17A has been obtained on the side surface of the workpiece WKB, but such an incorrect result has been obtained on the side surface of the workpiece WKC that the side surface is continuous with the stage ST at the same height where the workpieces are placed. On the other hand, according to the height information computed from the second projection pattern image shown in FIG. 17C, the side surface of the workpiece WKB and the side surface of the workpiece WKC both show incorrect results that the side surfaces further go below the stage ST.

Figure 18A:
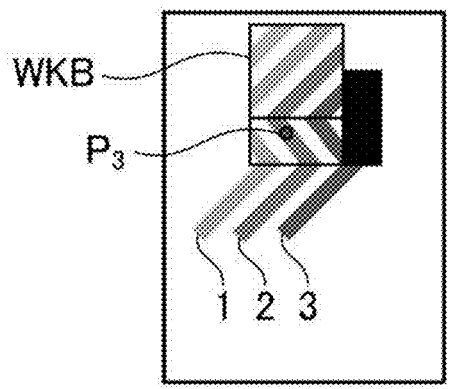
FIG. 18A is an original first projection pattern image of a workpiece WKB.
Figure 18B:
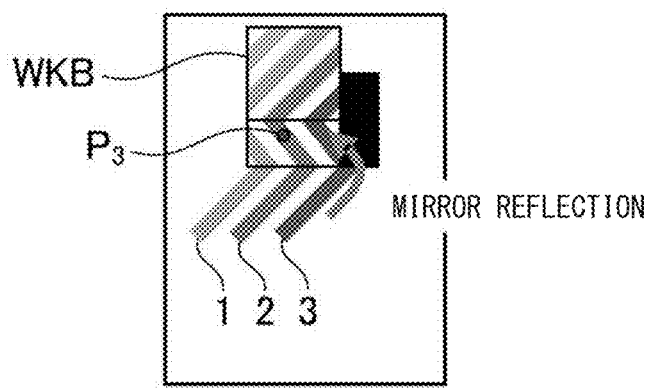
FIG. 18B is a first projection pattern image obtained due to mirror reflection.
Figure 18C:
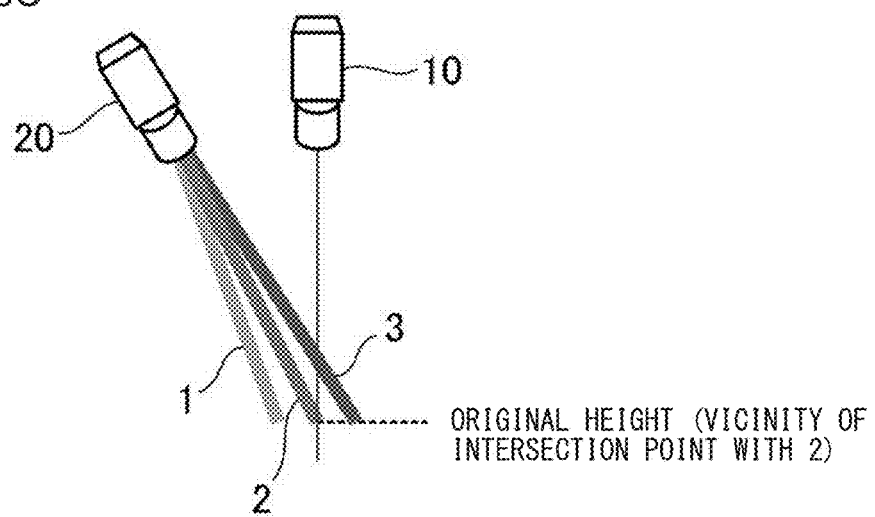
FIG. 18C is a schematic view showing measured height information.

The reason why the different results have occurred in the projection pattern images, taken from the same direction (light source) with respect to the same workpiece, as an outcome of the mirror reflection is that a difference in direction of the projection pattern causes occurrence of a difference in change of the projection pattern to be observed, thus leading to a difference in computing of a distance by triangulation, as described hereinafter. This situation will be sequentially described based on FIGS. 18A to 20C. First, FIGS. 18A to 18C show a situation where irradiation with the first projection pattern inclined by +45° is performed to obtain height information of the side surface of the workpiece WKB. When the side surface of the workpiece WKB is irradiated with the first projection pattern and an image is captured in the image capturing part 10 as in FIG. 18C, a projection pattern image as shown in FIG. 18A should originally be obtained. However, practically, a projection pattern image as shown in FIG. 18B is captured due to the mirror reflection. When a focus is placed on height information at a measurement point P3, it should originally be irradiated with a fringe 2, and hence in FIG. 18C, a height at an intersection between the fringe 2 and a visual line to the observation point extending from the image capturing part 10 is obtained. Practically, as shown in FIG. 18B, the irradiation pattern with which the stage ST is irradiated has been copied as if on a mirror due to the mirror reflection, but since this is a pattern close to the original pattern of FIG. 18A, a difference in obtained height is small, and a large error has not occurred.

Figure 19A:
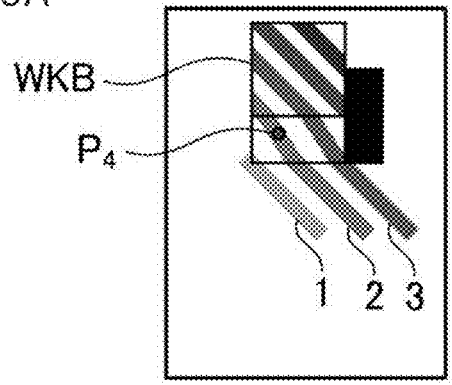
FIG. 19A is an original second projection pattern image of the workpiece WKB.
Figure 19B:
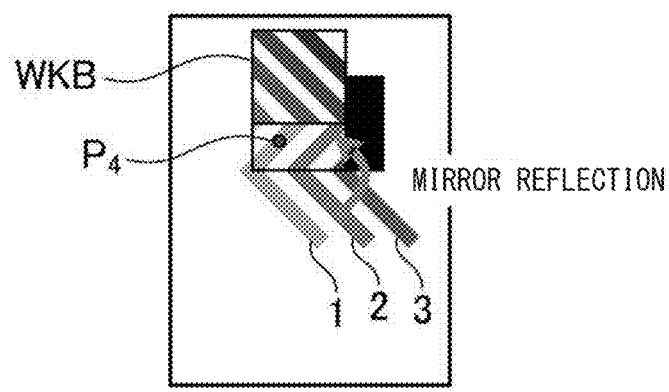
FIG. 19B is a second projection pattern image obtained due to the mirror reflection.
Figure 19C:
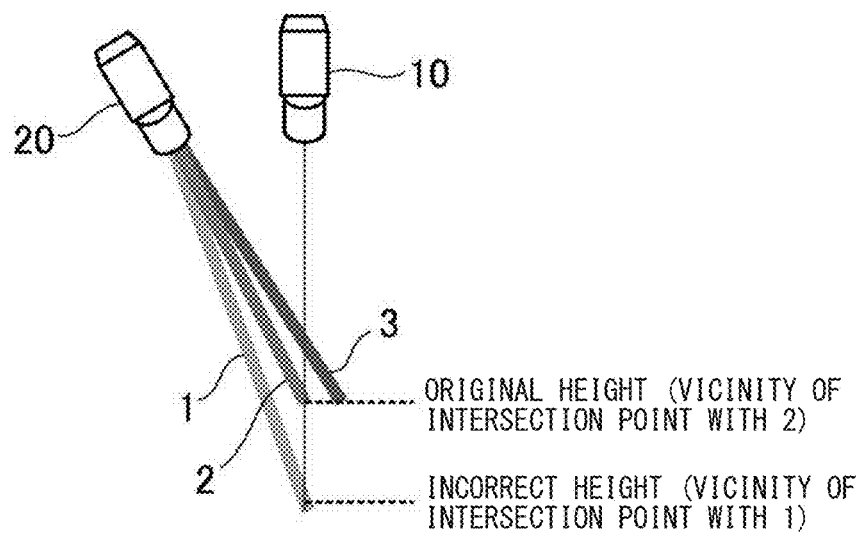
FIG. 19C is a schematic view showing measured height information.

On the other hand, FIGS. 19A to 19C show a situation where the side surface of the workpiece WKB is irradiated with a different projection pattern, here the second projection pattern inclined by −45°, to obtain height information. In this state, as a result of the mirror reflection, a projection pattern image greatly different from a projection pattern image that should originally be obtained as shown in FIG. 19A has been captured as in FIG. 19B. Consequently, height information at an observation point $P_4$ should originally be computed by means of the fringe 2 as shown in FIG. 19A, but practically, it has been computed by means of the next fringe 1 as shown in FIG. 19B. As a result, as shown in FIG.

19C, it has been computed as a height smaller than the stage ST, differently from the original height. A cause of occurrence of such an error in the measurement result of the height is as follows: in the pattern projecting methods such as the phase shift method and the spatial coding method, a predetermined number of times of pattern projection are performed while a phase is shifted in each projection pattern, but a phase of each pixel computed from the obtained plurality of projection pattern images is displaced due to the mirror reflection, leading to occurrence of a difference in the measurement result.

Figure 20A:
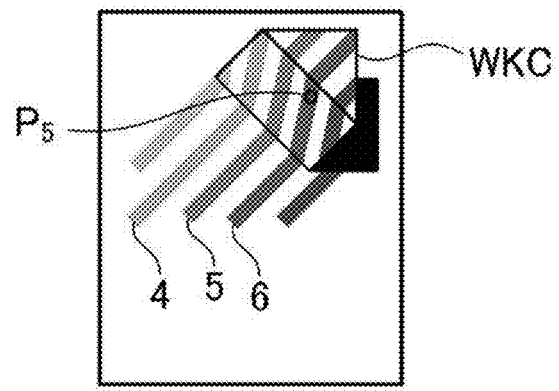
FIG. 20A is an original first projection pattern image of a workpiece WKC.
Figure 20B:
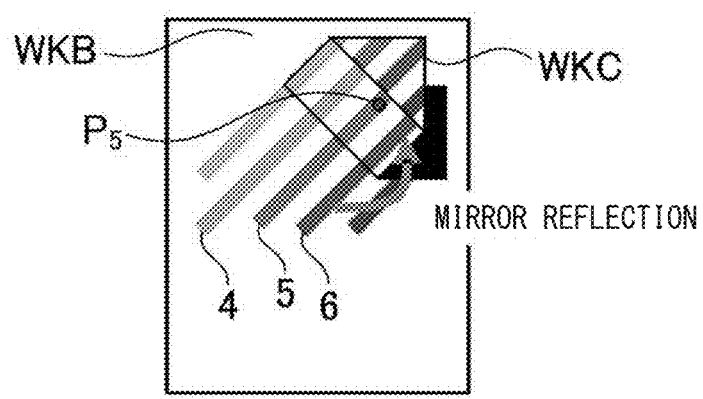
FIG. 20B is a first projection pattern image obtained due to the mirror reflection.
Figure 20C:
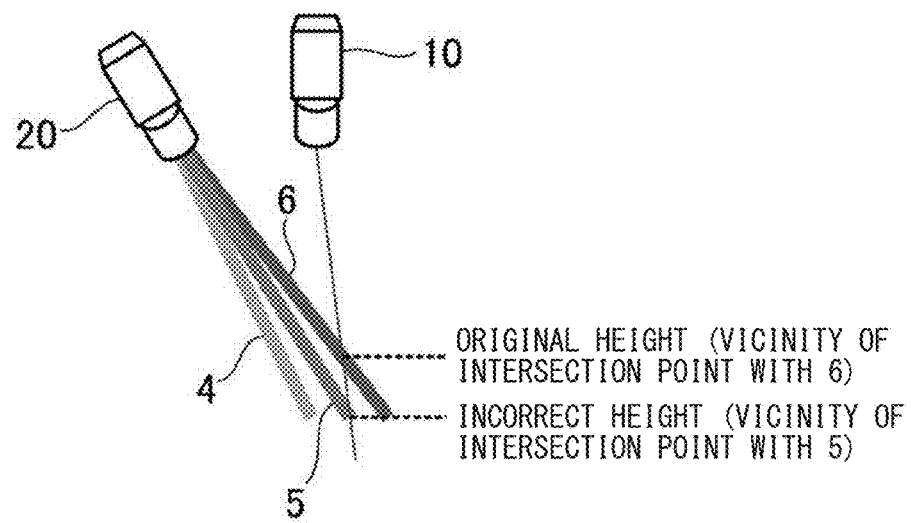
FIG. 20C is a schematic view showing measured height information.

Further, the height of the side surface of the workpiece WKC is also considered. First, FIGS. 20A to 20C show a situation where height information of the side surface of the workpiece WKC irradiated with the first projection pattern is obtained. Here, as a result of the mirror reflection, there has been captured a projection pattern image as in FIG. 20B, different from a projection pattern image that should originally be obtained as shown in FIG. 20A. Consequently, height information at an observation point $P_5$ should originally be computed by means of a fringe 6 as shown in FIG. 20A, but practically, it has been computed by means of the fringe 5 as shown in FIG. 20B. As a result, as shown in FIG. 20C, it has been computed as a height smaller than an intersection between the fringe 6 as the original height and a visual line of the observation point (an intersection with the fringe 5 has the same height as that of the stage).

Figure 21A:
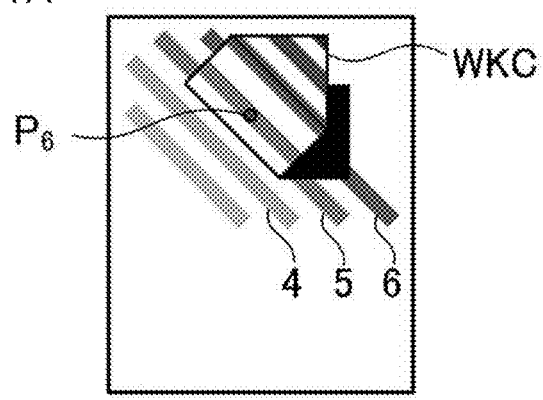
FIG. 21A is an original second projection pattern image of the workpiece WKC.
Figure 21B:
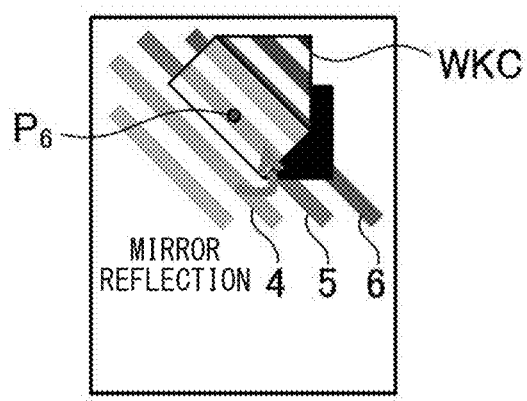
FIG. 21B is a second projection pattern image obtained due to the mirror reflection.
Figure 21C:
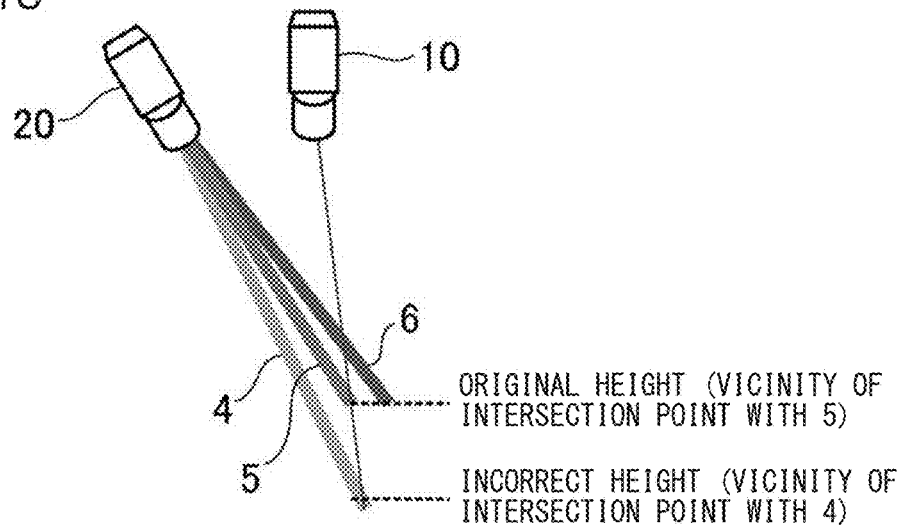
FIG. 21C is a schematic view showing measured height information.

On the other hand, FIGS. 21A to 21C show a situation where height information of the side surface of the workpiece WKC irradiated with the second projection pattern is obtained. Also here, as a result of the mirror reflection, there has been captured a projection pattern image as in FIG. 21B, different from a projection pattern image shown in FIG. 21A which should originally be obtained. Consequently, height information at an observation point $P_6$ should originally be computed by means of the fringe 5 as shown in FIG. 21A, but practically, it has been computed by means of the fringe 4 as shown in FIG. 21B. As a result, as shown in FIG. 21C, it has been computed as a height smaller than an intersection between the fringe 5 as the original height and a visual line of the observation point (an intersection with the fringe 4 has a smaller height than that of the stage).

As thus described, how the effect due to the mirror reflection appears varies depending on the projection pattern, and hence there occurs a state where a computing result of height information is different only in the portion where the mirror reflection has occurred. Conversely, when the projection pattern is changed, the occurrence of the multi-reflection can be detected by use of the character of being able to obtain different height information in a portion where the multi-reflection has occurred. That is, height information of the first distance image and that of the second distance image are compared for a corresponding portion, and height information of a portion where a difference not smaller than a predetermined threshold has occurred is determined as incorrect by the incorrect-height determining part 37. Specifically, returning to FIG. 14 for description, first in Step S1404, the position is moved to the initial positions. In Step S1405, height information of the first distance image and that of the second distance image in the moved position are extracted and compared to each other, and the incorrect-height determining part 37 determines whether or not a difference therebetween is not smaller than the predetermined threshold. When a difference not smaller than the threshold is detected, the processing goes to Step S1406, to output the incorrectness. Here, a flag indicating the incorrectness is written in the pixel, and the processing goes to Step S1407. On the other hand, when a difference is smaller than the threshold, the processing goes to Step S1407 while Step S1406 is skipped, and it is determined whether the determination processing has completed in all positions. When it has not, the processing goes to Step S1408 to move the position, namely the pixel, and thereafter the processing returns to Step S1405, to repeat the processing. Then, when the determination processing on all the pixels has completed, the processing is completed.

It is to be noted that in this example, height information are compared with respect to each of all pixels, but this example is not restrictive, and the processing can be simplified by making the comparison by units of several pixels. Further, the processing for comparing height information can be simplified by such means as allowing the user to previously specify a region where pieces of height information are compared, specifically a region where the workpiece exists, or automatically setting a target region by image processing.

In such a manner, it is possible to remove incorrect height information by performing simple computing while using not any additional member but the existing equipment, so as to obtain an advantage of being able to perform measurement and determination only by means of three-dimensional information having high reliability.

In addition, when detecting the incorrectness of height information, the incorrect-height determining part 37 records a flag indicating an incorrect value as height information of the portion. Herewith, at the time of performing computing by use of the distance image, it is possible to perform processing not affected by an incorrect result by not computing a portion with the flag, or by some other means. Further, such a portion where height information is determined as incorrect may be treated in a similar manner to, for example, a portion where a shade has generated due to irradiation with a projection pattern, a portion where phase-shift contrast is low and measurement cannot be performed, or some other portion.

Moreover, when computing that includes an incorrect value is specified, processing can be advanced in accordance with a use or a purpose in such a manner that, by notifying the user that height information is incorrect or by some other means, the user is promoted to perform resetting, or the computing is suspended, or is performed on the premise that the information is incorrect. It is thus possible to avoid a situation where computing or the like is performed without being aware that the information has low reliability, so as to hold credibility of a measurement result.

Figure 22A:
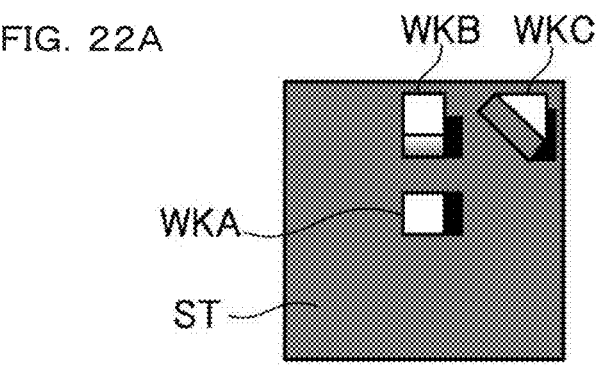
FIG. 22A shows an image view of a first distance image of the workpieces of FIG. 27.
Figure 22B:
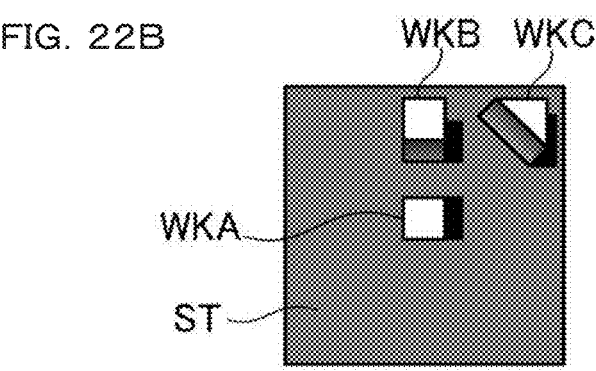
FIG. 22B shows an image view of a second distance image.
Figure 22C:
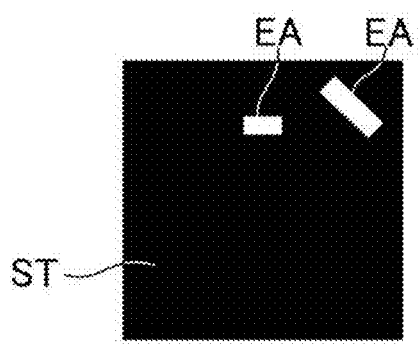
FIG. 22C shows an image view of an image obtained by extracting areas with incorrect height information from FIGS. 22A and 22B.
Figure 22D:
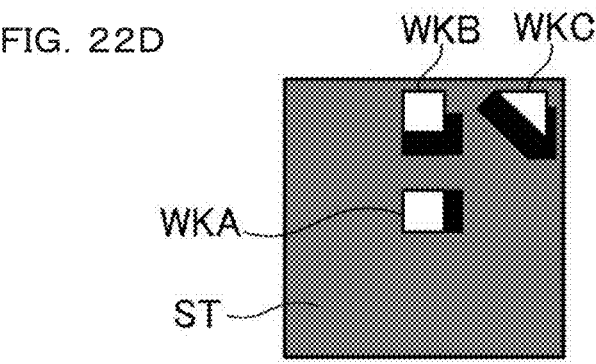
FIG. 22D shows an image view of a synthetic distance image obtained by removing FIG. 22C from FIGS. 22A and 22B and performing averaging.
Figure 23:
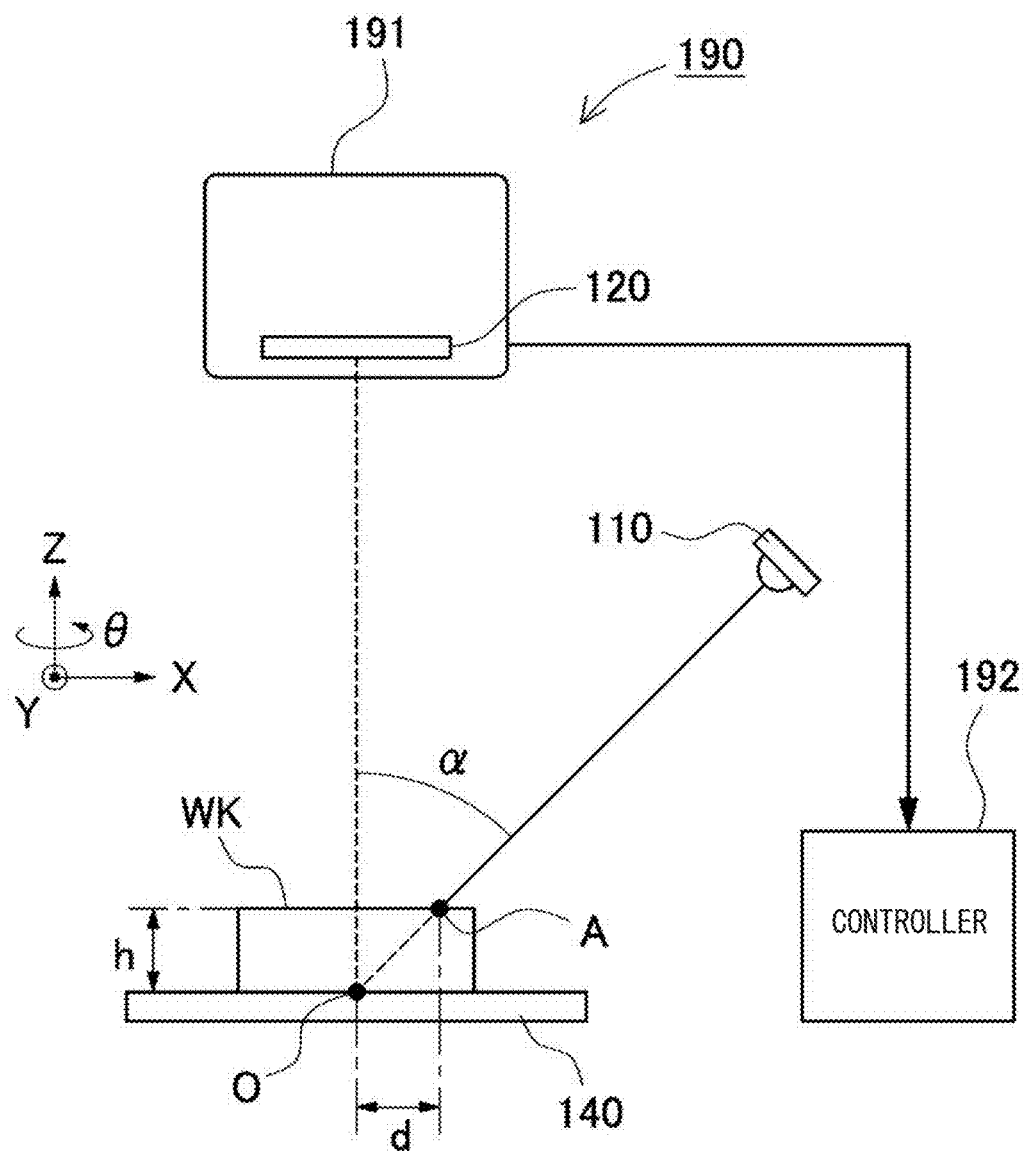
FIG. 23 is a schematic view showing a situation where a distance image is captured by a triangulation system.

Meanwhile, with two distance images generated, by averaging two measurement results in a portion determined as not incorrect, it is possible to seek higher accuracy in height information. For example, the first distance image as shown in FIG. 22A is compared with the second distance image shown in FIG. 22B, to extract and remove each incorrect place EA where a difference not smaller than a threshold has occurred in height information as in FIG. 22C, and the remaining portion is averaged, to generate a synthetic height image as shown in FIG. 22D. This can avoid mixture of a correct measurement result and an incorrect measurement result, and suppress a harmful effect on the post-stage processing due to the incorrect result. Additionally, averaging the two distance images can also suppress a measurement error, and further improve the measurement accuracy of height information.

Figure 4A:
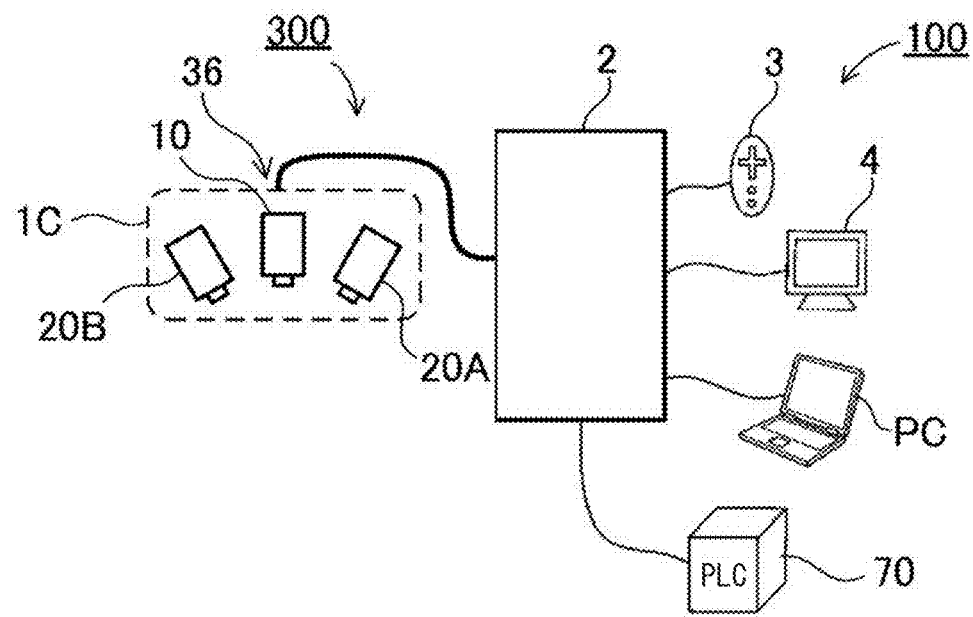
FIG. 4A is a head section of a three-dimensional image processing apparatus according to a third embodiment of the present invention.
Figure 4B:
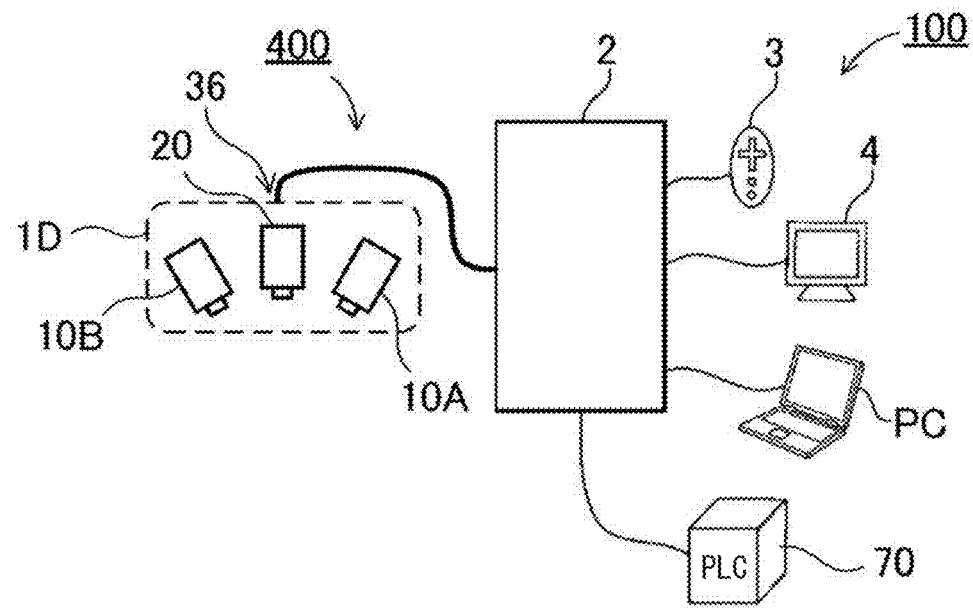
FIG. 4B is a schematic view showing a head section of a three-dimensional image processing apparatus according to a fourth embodiment.

In the present example based on the third embodiment, two light projecting parts 20A and 20B are provided as shown in FIG. 4A, but in the foregoing description, one (e.g., the light projecting part 20B that projects light from the left side) out of those light projecting parts has been used. A similar processing can also be performed using the other light projecting part (e.g. the light projecting part 20A that projects light from the right side). Herewith, it is possible to generate two distance images, highly accurate average distance image obtained by removing an incorrect place by one light projecting part, and a highly accurate averaged distance image obtained from a different angle by the other light projecting part. (Internally, the first and second projection patterns are projected by each of the light projecting parts, and hence a total of four kinds of distance images are generated.) Since one measurement system can be constituted by one image capturing part and one light projecting part, in the embodiment where the two light projecting parts are provided, two measurement systems can be constructed. By further synthesizing highly accurate averaged distance images obtained by these two different measurement systems, it is possible to generate a highly accurate distance image where a portion that is shaded by light projection is compensated.

In addition, this synthesis may be performed in a sequence described below. First, synthesis is performed between the respective measurement systems by use of the first projection pattern, and thereafter, synthesis is performed between the respective measurement systems by use of the second projection pattern. Finally, the obtained two synthetic images are compared, an incorrect place where a difference not smaller than a threshold has occurred in height information is removed, followed by averaging of the remaining portion, to generate a highly accurate distance image. Alternatively, it is also possible that synthesis is performed with respect to each light projection system by use of the first projection pattern and the second projection pattern, the synthetic images obtained by the respective light projection systems are then compared, and similarly to the above, an incorrect place where a difference not smaller than a threshold has occurred in height information is removed, followed by averaging of the remaining portion, to generate a highly accurate distance image. As thus described, even when the procedure for synthesis is changed, there can be obtained a similar effect that an incorrect place is removed and the remaining portion is made highly accurate.

A three-dimensional image processing apparatus, a three-dimensional image processing method, a three-dimensional image processing program, a computer-readable recording medium, and a recording device according to the present invention are applicable to an inspection apparatus using the principle of triangulation, and the like.

What is claimed is:

1. A three-dimensional image processing apparatus which is capable of acquiring a distance image that includes height information of an inspection target and also performing image processing based on the distance image, the apparatus comprising:
   a light projecting part for projecting incident light as structured illumination of a predetermined fringe-like projection pattern from an oblique direction with respect to an optical axis of a below-described image capturing part;
   the image capturing part for acquiring reflected light that is projected by the light projecting part and reflected on an inspection target, to capture a plurality of pattern projected images;
   a distance image generating part capable of generating a distance image based on the plurality of images captured in the image capturing part;
   a pattern generating part for generating a first projection pattern and a second projection pattern whose fringe direction is different from that of the first projection pattern as a plurality of projection patterns obtained by changing a fringe direction of the projection pattern; and
   an incorrect-height determining part for making comparison in height information of a corresponding portion of the inspection target between a first distance image, generated in the distance image generating part based on a first pattern projected image obtained by projecting from the light-projecting part the first projection pattern generated in the pattern generating part and capturing an image of the first projection pattern in the image capturing part, and a second distance image, generated based on a second pattern projected image obtained by the second projection pattern projected from the common light projecting part, to determine height information of a portion where a difference not smaller than a predetermined value occurs as incorrect.

2. The three-dimensional image processing apparatus according to claim 1, wherein the pattern generating part generates as the first projection pattern a projection pattern whose fringe direction is inclined with respect to a vertical direction and a horizontal direction.

3. The three-dimensional image processing apparatus according to claim 2, wherein the pattern generating part generates as the first projection pattern a projection pattern whose fringe direction is inclined by 45° from the vertical direction.

4. The three-dimensional image processing apparatus according to claim 1, wherein the pattern generating part generates as the second projection pattern a projection pattern that is symmetrical to the first projection pattern.

5. The three-dimensional image processing apparatus according to claim 1, wherein the pattern generating part includes a digital micro-mirror device.

6. The three-dimensional image processing apparatus according to claim 5, wherein a micro-mirror constituting each pixel of the digital micro-mirror device has a rectangular shape in a plan view, and each micro-mirror is arranged in a posture inclined in a diamond shape.

7. The three-dimensional image processing apparatus according to claim 1, wherein the distance image generating part is capable of generating a synthetic image obtained by averaging the first distance image and the second distance image except for a portion determined as incorrect in the incorrect-height determining part.

8. The three-dimensional image processing apparatus according to claim 1, wherein the incorrect-height determining part inserts a flag as incorrect information into a portion where a difference not smaller than the predetermined value is determined to occur.

9. The three-dimensional image processing apparatus according to claim 1, wherein the incorrect-height determining part treats a portion where a difference not smaller than the predetermined value is determined to occur, in a similar manner to a non-measurable place.

10. The three-dimensional image processing apparatus according to claim 1, wherein the light projecting part projects structured illumination for obtaining the distance image by use of at least a phase shift method and a spatial coding method.

11. A three-dimensional image processing method for acquiring a distance image that includes height information of an inspection target and performing image processing based on the distance image, the method comprising the steps of:

previously setting a first projection pattern and a second projection pattern whose fringe direction is different from that of the first projection pattern as a plurality of projection patterns obtained by changing a fringe direction of a projection pattern for structured illumination, and projecting from a light projecting part incident light as structured illumination of the first projection pattern from an oblique direction with respect to an optical axis of an image capturing part;

acquiring reflected light that is projected by the light projecting part and reflected on an inspection target, to capture a first pattern projected image in the image capturing part;

generating a first distance image in a distance image generating part based on a plurality of images captured in the image capturing part;

projecting from the light projecting part incident light as structured illumination of the second projection pattern from the same direction as the first projection pattern with respect to the optical axis of the image capturing part;

acquiring reflected light that is projected by the light projecting part and reflected on the inspection target, to capture a second pattern projected image in the image capturing part;

generating a second distance image in the distance image generating part based on a plurality of images captured in the image capturing part; and making comparison in height information of a corresponding portion of the inspection target between the first distance image and the second distance image, to determine height information of a portion where a difference not smaller than a predetermined value occurs as incorrect if this exists.

12. A three-dimensional image processing program stored on a non-transitory computer readable medium, which is capable of acquiring a distance image that includes height information of an inspection target and also performing image processing based on the distance image, wherein the program, when executed by a computer, performing:

a projection pattern setting function of previously setting a first projection pattern and a second projection pattern whose fringe direction is different from that of the first projection pattern as a plurality of projection patterns obtained by changing a fringe direction of a projection pattern for structured illumination;

a distance image generating function of generating a first distance image and a second distance image based on a first pattern projected image and a second pattern projected image captured by projecting by a light projecting part incident light as structured illumination of the first projection pattern and the second projection pattern set by the projection pattern setting function, from an oblique direction with respect to an optical axis of an image capturing part and acquiring reflected light reflected on an inspection target; and an incorrect-height determining function of making comparison in height information of a corresponding portion of the inspection target between the first distance image and the second distance image, to determine height information of a portion where a difference not smaller than a predetermined value occurs as incorrect if this exists.

\* \* \* \* \*